(12) United States Patent
Ishikawa et al.

(10) Patent No.: US 8,368,844 B2
(45) Date of Patent: Feb. 5, 2013

(54) AREA LIGHT SOURCE DEVICE AND LIQUID CRYSTAL DISPLAY DEVICE

(75) Inventors: Takako Ishikawa, Kusatsu (JP);
Yasuhiro Tanoue, Otsu (JP); Masayuki Shinohara, Nagaokakyo (JP); Yoshihiro Ueno, Kusatsu (JP)

(73) Assignee: OMRON Corporation, Kyoto (JP)

( * ) Notice: Subject to any disclaimer, the term of this patent is extended or adjusted under 35 U.S.C. 154(b) by 214 days.

(21) Appl. No.: 13/004,648

(22) Filed: Jan. 11, 2011

(65) Prior Publication Data
US 2011/0170036 A1 Jul. 14, 2011

(30) Foreign Application Priority Data
Jan. 13, 2010 (JP) ................................. 2010-004655

(51) Int. Cl.
*G02F 1/1335* (2006.01)
(52) U.S. Cl. ........................................................ 349/65
(58) Field of Classification Search ...................... 349/65
See application file for complete search history.

(56) References Cited

U.S. PATENT DOCUMENTS

| | | | |
|---|---|---|---|
| 6,667,782 B1 | 12/2003 | Taira et al. | |
| 2011/0187967 A1* | 8/2011 | Shinohara et al. | 349/65 |
| 2011/0299013 A1* | 12/2011 | Ishida et al. | 349/65 |
| 2011/0310332 A1* | 12/2011 | Boyd et al. | 349/65 |

FOREIGN PATENT DOCUMENTS

| | | |
|---|---|---|
| JP | 05-088174 | 4/1993 |
| JP | 2001-110218 | 4/2001 |
| JP | 2002-343124 A | 11/2002 |
| JP | 2004-095390 A | 3/2004 |
| JP | 2004-279815 A | 10/2004 |
| JP | 2006-331757 A | 12/2006 |
| JP | 2008-015467 A | 1/2008 |
| WO | 2008/153024 A1 | 12/2008 |
| WO | 2009104793 A1 | 8/2009 |
| WO | 2010/004745 | 1/2010 |

OTHER PUBLICATIONS

Office Action for Japanese Application No. 2010-004470 dated Nov. 1, 2011, with English translation thereof (6 pages).
Patent Abstract for Japanese Publication No. 2002-343124 published Nov. 29, 2002 (1 page).
Patent Abstract for Japanese Publication No. 2006-331757 published Dec. 7, 2006 (1 page).

(Continued)

*Primary Examiner* — Sung Pak
(74) *Attorney, Agent, or Firm* — Osha Liang LLP

(57) ABSTRACT

An area light source device that is capable of more evenly emitting light and capable of enhancing the light emission luminance by exiting light of narrower directional characteristics. A light guide substrate includes a light introducing section and a light guide plate main body for exiting the light from a light exit surface. A number of diffusion patterns are formed at the light exit surface. A low refraction index layer is formed at the lower surface of the light guide plate main body, and a reflection layer is formed at the lower surface of the low refraction index layer. The point light source is arranged at a position facing the end face of the light introducing section. A tapered portion inclined to gradually increase the thickness of the light introducing section the farther away from the light source is arranged on the upper surface of the light introducing section.

15 Claims, 40 Drawing Sheets

OTHER PUBLICATIONS espacenet patent abstract for PCT Application No. 2010004745, Publication date Jan. 14, 2010 (1 page).
Office Action for Japanese Patent Application No. 2010-004655 mailed Nov. 1, 2011, with English translation thereof (8 pages).
Patent Abstract for Japanese Publication No. 2009104793 Published Aug. 27, 2009 (1 page).
Patent Abstract for Japanese Publication No. 2004-279815 Published Oct. 7, 2004 (1 page).
Patent Abstract for Japanese Publication No. 2008-015467 Published Jan. 24, 2008 (1 page).
Patent Abstract for Japanese Publication No. 2004-095390 Published Mar. 25, 2004 (1 page).

* cited by examiner

PRIOR ART

LUMINANCE

DISTANCE FROM LIGHT SOURCE

PRIOR ART

PRIOR ART

PRIOR ART

AREA LIGHT SOURCE DEVICE AND LIQUID CRYSTAL DISPLAY DEVICE

1. TECHNICAL FIELD

The present invention relates to area light source devices and liquid crystal display devices, and specifically, to an area light source device capable of resolving the luminance unevenness at the light emitting surface and achieving narrow directivity of the exit light, and also capable of achieving evenness of the light emitting surface and higher luminance, and a liquid crystal display device using the area light source device.

2. BACKGROUND (Regarding Japanese Unexamined Patent Publication No. 5-88174) An additive sheet such as a light diffusion sheet needs to be omitted and the thickness of the entire light guide plate needs to be thinned in order to thin a backlight used in the liquid crystal display device, and the like.

However, if the thickness of the light guide plate is thinned, the light guide plate becomes thin like a sheet, and thus the light guide plate tends to easily warp. If the light guide plate tends to easily warp, the assembly of the backlight becomes difficult and the light may leak from the area where the light guide plate warped. Thus, a method of laminating the light guide plate to the back surface of a liquid crystal display panel with an adhesive etc. without sandwiching an air layer between the light guide plate and the liquid crystal display panel is known for the method of preventing the warp of the thinned light guide plate.

A liquid crystal display device in which the light guide plate is adhered to the back surface of the liquid crystal display panel includes that described in the first comparative example of Japanese Unexamined Patent Publication No. 5-88174 (see FIG. 3 of Japanese Unexamined Patent Publication No. 5-88174). As shown in FIG. 1, in such liquid crystal display device 11, an acrylic plate having smooth surfaces (index of refraction of 1.49) is used for the light guide plate 12, and the light guide plate 12 is laminated to the back surface of a scattering type liquid crystal display panel 14 so as not to sandwich the air layer using a connection layer 13 having an index of refraction higher than the light guide plate 12 (two pack curable silicon having index of refraction of 1.51). A light source 15 including a cold cathode tube is installed at positions facing both end faces of the light guide plate 12.

As shown in FIG. 2A, in the liquid crystal display device 11, the light L exit from the light source 15 and entered into the light guide plate 12 transmits from the light guide plate 12 to the connection layer 13, and further enters the liquid crystal display panel 14 to be scattered at pixels in a scattered state (clouded state) and exit to the front side, thereby causing the pixels to emit light.

However, in such liquid crystal display device, the light is not totally reflected at the boundary of the connection layer 13 and the light guide plate 12 as with the light L shown with a broken line in FIG. 2A since the index of refraction of the connection layer 13 is higher than the index of refraction of the light guide plate 12. Thus, the light L entered to the light guide plate 12 cannot be guided through the light guide plate 12, and is exit from the liquid crystal display panel 14 in the vicinity of the light source 15. As a result, the light emission luminance is high and bright at locations close to the light source 15, but the light emission luminance is low and dark at locations distant from the light source 15 (i.e., central portion of the light sources 15), as shown in the luminance distribution in FIG. 2B.

In a first example described in Japanese Unexamined Patent Publication No. 5-88174 (see FIG. 1 of Japanese Unexamined Patent Publication No. 5-88174), a thin film 16 having an index of refraction lower than the light guide plate 12 is partially formed on the surface of the light guide plate 12, where the area ratio of the thin film 16 is set large at locations close to the light source 15 and the area ratio of the thin film 16 is set small at locations distant from the light source 15, as shown in FIG. 3, to resolve the unevenness of the light emission luminance. The light guide plate 12 formed with the thin film 16 is laminated to the back surface of the liquid crystal display panel 14 through the connection layer 13 having an index of refraction higher than the light guide plate 12. Here, the light guide plate 12 is formed by an acrylic plate having an index of refraction of 1.49, a two-pack type curable silicone having an index of refraction of 1.41 is used for the thin film 16, and a two-pack type curable silicone having an index of refraction of 1.51 is used for the connection layer 13.

In the first example of Japanese Unexamined Patent Publication No. 5-88174, the light in the light guide plate 12 is guided through the light guide plate 12 by being totally reflected at the boundary of the light guide plate 12 and the thin film 16 since the thin film 16 is formed on the surface of the light guide plate 12. Furthermore, the ratio of light transmitted between the thin films 16 and exit from the liquid crystal display panel 14 is small since the area ratio of the thin film 16 is large at locations close to the light source 15, and the ratio of light passed between the thin films 16 and exit from the liquid crystal display panel 14 is large since the area ratio of the thin film 16 is small at locations distant from the light source 15 where the amount of light that reaches is small, and consequently, the evenness of the light emission luminance is achieved in the entire display surface of the liquid crystal display device.

In a second example described in Japanese Unexamined Patent Publication No. 5-88174 (see FIG. 2 of Japanese Unexamined Patent Publication No. 5-88174), as shown in FIG. 4, a concave-convex portion 17 having a prism shape is partially formed on the surface of the light guide plate 12, where the degree of roughness of the concave-convex portion 17 is set low at locations close to the light source 15 and the degree of roughness of the concave-convex portion 17 is set high at locations distant from the light source 15. The light guide plate 12 formed with the concave-convex portion 17 is laminated to the back surface of the liquid crystal display panel 14 through the connection layer 13 having a lower index of refraction than the light guide plate 12. Here, the light guide plate 12 is formed by an acrylic plate having an index of refraction of 1.49, and a two-pack type curable silicone having an index of refraction of 1.41 is used for the connection layer 13.

In a second example of Japanese Unexamined Patent Publication No. 5-88174, the light in the light guide plate 12 is enclosed in the light guide plate 12 by being totally reflected at a smooth region of the surface of the light guide plate 12 and then guided through the light guide plate 12 since the index of refraction of the connection layer 13 is lower than the index of refraction of the light guide plate 12. The light entering the concave-convex portion 17 is scattered by the concave-convex portion 17 so as to be transmitted to the connection layer 13, and scattered by the pixels in the scattered state of the liquid crystal display panel 14 thereby emitting light. Furthermore, the ratio of light scattered at the concave-convex portion 17 and exit from the liquid crystal display panel 14 is small since the degree of roughness of the concave-convex portion 17 is low at locations close to the light source 15, and the ratio of light scattered at the concave-convex portion 17 and exit from the liquid crystal display panel 14 is large since the degree of roughness of the concave-convex portion 17 is high at locations distant from the light source 15 where the amount of light that reaches is small, and consequently, the evenness of the light emission luminance is achieved in the entire display surface of the liquid crystal display device.

In the first example of Japanese Unexamined Patent Publication No. 5-88174, the directional characteristics of the light in a plane perpendicular to the light guide plate 12 are shown in FIG. 5A. The spread (directional characteristics) of the light immediately before entering the light guide plate 12 is ±90°, but the spread of light immediately after entering the light guide plate 12 is ±arc sin (1/1.49)=±42.2° since the index of refraction of the light guide plate 12 is ng=1.49. The critical angle of total reflection at the boundary of the light guide plate 12 and the thin film 16 is, arc sin (1.41/1.49) =71.1°. The critical angle 71.1° is 18.9° when measured from the horizontal direction.

Therefore, the light (light in the shaded range in FIG. 5B) in the range of 18.9° to 42.2° and the light in the range of −18.9° to −42.2° measured from the horizontal direction out of the light having the spread of ±42.2° that entered the light guide plate 12 transmit through the thin film 16 without being reflected at the boundary with the thin film 16 when entered to the boundary with the thin film 16. The light of the shaded range in FIG. 5B is not guided through the light guide plate 12 as it is transmitted through the thin film 16 in the vicinity of the light source 15, and hence sufficient amount of light cannot be guided from the light source 15 to a distant location, and the light emission luminance cannot be sufficiently evened.

In the second example of Japanese Unexamined Patent Publication No. 5-88174 as well, the light in the range of 18.9° to 42.2° and the light in the range of −18.9° to −42.2° measured from the horizontal direction out of the light having the spread of ±42.2° that entered the light guide plate 12 transmit through the connection layer 13 without being reflected at the smooth region of the light guide plate 12 since the index of refraction of the connection layer 13 is 1.41, same as the thin film 16 of the first example. Therefore, in the second example as well, the light of the shaded range in FIG. 5B is not guided through the light guide plate 12 as it is transmitted through the connection layer 13 in the vicinity of the light source 15, and hence sufficient amount of light cannot be guided from the light source 15 to a distant location, and the light emission luminance cannot be sufficiently evened.

In the liquid crystal display device disclosed in Japanese Unexamined Patent Publication No. 5-88174, the vicinity of the light source lights up brightly since the light easily leaks in the vicinity of the light source thereby causing luminance unevenness at the display surface, and the display surface becomes dark due to lowering of the usage efficiency of the light.

In the present specification, an idiomatically used method is sometimes used to represent the directional characteristics and the directivity spread of the light. For instance, the spread of light is sometimes simply expressed as ±42.2° instead of being expressed as −42.2° to +42.2° (i.e., −42.2≦X≦42.2, where X is the spread of light).

(Regarding Japanese Unexamined Patent Publication No. 2001-110218)

A liquid crystal display device in which the thickness of the light guide plate is thinned and the attenuation of light by the additional sheet is eliminated by omitting the additional sheet such as a prism sheet, and the luminance of the display surface is enhanced by narrowing the directional characteristics of the exit light includes that disclosed in Japanese Unexamined Patent Publication No. 2001-110218.

FIG. 6 is a schematic view showing a structure of a liquid crystal display device disclosed in Japanese Unexamined Patent Publication No. 2001-110218. The liquid crystal display device 21 has a liquid crystal display panel 23 overlapped over the entire surface of an area light source device 22. The area light source device 22 includes a wedge-shaped light guide plate 24, where a first light transmissive layer 25 having a lower index of refraction than the light guide plate 24 is overlapped on the lower surface of the light guide plate 24, and a light deflection layer 26 having substantially the same index of refraction as the light guide plate 24 is overlapped on the lower surface of the first light transmissive layer 25. The light deflection layer 26 is obtained by integrally forming a micro-mirror 28 made from metal material on the back surface of a second light transmissive layer 27 having substantially the same index of refraction as the light guide plate 24.

A light source 29 such as a cold cathode fluorescent lamp is arranged facing the end face on the large thickness side of the light guide plate 24.

The optical path is shown with an arrow in FIG. 6, where the light radiated from the light source 29 passes the side surface of the light guide plate 24 and enters the light guide plate 24 in the area light source device 22. The light that entered the light guide plate 24 is guided through the light guide plate 24 while repeating total reflection between the upper surface and the lower surface of the light guide plate 24. Regarding the light in the light guide plate 24, the incident angle (angle formed by the light beam and a normal line at the lower surface of the light guide plate 24) of when entering the lower surface of the light guide plate 24 becomes smaller every time the light is totally reflected at the upper surface and the lower surface of the wedge-shaped light guide plate 24. When the incident angle of light entering the lower surface of the light guide plate 24 becomes smaller than the critical angle of total reflection at the boundary of the first light transmissive layer 25 and the light guide plate 24, such light is transmitted through the lower surface of the light guide plate 24 and entered to the first light transmissive layer 25, and then entered into the second light transmissive layer 27 and reflected at the micro-mirror 28, where the light reflected at the micro-mirror 28 is transmitted through the second light transmissive layer 27, the first light transmissive layer 25, and the light guide plate 24, and exit from the upper surface (light exit surface) of the light guide plate 24.

In the area light source device 22 having such structure, only the light in a narrow range, in which the incident angle of when entering the lower surface of the light guide plate 24 is smaller than the critical angle of total reflection, out of the light guided through the light guide plate 24 is transmitted through the first and second light transmissive layers 25, 27 and reflected at the micro-mirror 28, and hence the light of narrow directional characteristics can be exit from the area light source device 22.

However, since the first light transmissive layer 25 having a lower index of refraction than the light guide plate 24 is closely attached to the lower surface of the light guide plate 24 without interposing an air layer even in the relevant area light source device 22, the light corresponding to the shaded range in FIG. 5B is transmitted through the first and second light transmissive layers 25, 27 and reflected at the micro-mirror 28, and then exit all at once from the front surface of the area light source device 22 when entered to the lower surface of the light guide plate 24 the first time as shown in FIG. 7. Thus, the vicinity of the light source 29 lights up brightly thereby causing luminance unevenness, and the entire display surface cannot evenly emit light even when such area light source device 22 is used. Moreover, the display surface becomes dark since the light leaks in the vicinity of the light source 29 and the usage efficiency of the light lowers.

SUMMARY

One or more embodiments of the invention provides an area light source device capable of more evenly emitting light by reducing the leakage of light in the vicinity of the light source, and capable of enhancing the light emission luminance by exiting light of narrower directional characteristics. One or more embodiments of the invention also provides a liquid crystal display device using the area light source device.

In accordance with one aspect, a first area light source device according to one or more embodiments of the present invention includes a light source and a light guide plate, arranged at a position facing the light source, for introducing light of the light source from a light incident end face and exiting the light to the outside from a light exit surface, wherein the light guide plate includes a light guide substrate made of translucent material, a low refraction index layer having a lower index of refraction than the light guide substrate, the low refraction index layer being closely attached to a surface on a side opposite to the light exit surface of the light guide substrate without interposing an air layer, and a reflection layer closely attached to a surface on a side opposite to the light exit surface of the low refraction index layer without interposing an air layer; the light guide substrate has a light introducing section arranged at a position facing the light source and a light guide plate main body including the light exit surface for exiting the light introduced from the light introducing section to the outside integrally configured; a tapered portion inclined to gradually increase the thickness of the light introducing section the farther away from the light source is arranged on the surface on the light exit side of the light introducing section or the surface on the opposite side, a light control pattern for reflecting the light in the light guide plate main body and leaking the light towards the low refraction index layer from the surface on the side opposite to the light exit surface of the light guide plate main body is formed on the light exit surface side of the light guide plate main body, and a light exit unit for reflecting the light leaked to the low refraction index layer and exiting the light from the light exit surface is formed on an boundary of the low refraction index layer and the reflection layer or a surface on the side opposite to the boundary of the reflection layer.

In the first area light source device in one or more embodiments of the present invention, the directional characteristics of the light guided through the light guide plate main body can be narrowed by the tapered portion for light control, and the leakage of light in the vicinity of the light source can be prevented. As a result, the evenness of the luminance distribution at the light emitting surface can be enhanced and the luminance of the light emitting surface can be enhanced by enhancing the usage efficiency of the light. Furthermore, the directional characteristics of the light exit from the light exit surface can be more narrowed by transmitting one part of the light, which directional characteristics are narrowed by the tapered portion, to the low refraction index layer, and the front surface luminance of the area light source device can be enhanced. The controllability of light by the light control pattern and the light exit unit also are enhanced by narrowing the directivity of the light in the light guide plate main body with the tapered portion. Therefore, according to the area light source device, a back light having narrow directivity, high luminance, and even light emission can be realized.

In accordance with another aspect, a second area light source device in accordance with one or more embodiments of the present invention includes a light source and a light guide plate, arranged at a position facing the light source, for introducing light of the light source from a light incident end face and exiting the light to the outside from a light exit surface, wherein the light guide plate includes a light guide substrate made of translucent material, a low refraction index layer having a lower index of refraction than the light guide substrate, the low refraction index layer being closely attached to a surface on a side opposite to the light exit surface of the light guide substrate without interposing an air layer, a high refraction index layer having a higher index of refraction than the low refraction index layer, the high refraction index layer being closely attached to a surface on a side opposite to the light exit surface of the low refraction index layer without interposing an air layer, and a reflection layer closely attached to a surface on a side opposite to the light exit surface of the high refraction index layer without interposing an air layer; the light guide substrate has a light introducing section arranged at a position facing the light source and a light guide plate main body including the light exit surface for exiting the light introduced from the light introducing section to the outside integrally configured; a tapered portion inclined to gradually increase the thickness of the light introducing section the farther away from the light source is arranged on the surface on the light exit side of the light introducing section or the surface on the opposite side, a light control pattern for reflecting the light in the light guide plate main body and leaking the light towards the low refraction index layer from the surface on the side opposite to the light exit surface of the light guide plate main body is formed on the light exit surface side of the light guide plate main body, and a light exit unit for reflecting the light leaked to the high refraction index layer and exiting the light from the light exit surface is formed on an boundary of the high refraction index layer and the reflection layer or a surface on the side opposite to the boundary of the reflection layer.

Effects similar to the first area light source device are obtained in the second area light source device in one or more embodiments of the present invention. Furthermore, in the second area light source device, the light of low refraction index layer becomes Light of narrower directivity by entering the high refraction index layer. The light which directional characteristics are narrowed by the high refraction index layer are reflected by the light exit unit and exit from the light exit surface. As a result, according to the second area light source device, the exit light may have narrower directivity and the front surface luminance can be enhanced.

In accordance with the aspects of the first or second area light source device in one or more embodiments of the present invention, a second low refraction index layer having a lower index of refraction than the light guide substrate is closely attached to a surface on the light exit surface side of the light guide substrate without interposing an air layer. In this aspect, the light reflected by the light exit unit can be easily exit to the outside since the second low refraction index layer is arranged at the light exit surface. The light in the light guide plate main body is prevented from directly leaking to the second low refraction index layer side due to the function of the tapered portion even if the second low refraction index layer is arranged at the light exit surface.

In accordance with another aspect of the first or second area light source device in one or more embodiments of the present invention, a reverse tapered portion inclined to gradually reduce the thickness of the light introducing section the farther away from the light source is arranged in a region closer to the light source than the tapered portion at the surface on the light exit side of the light introducing section or the surface on the side opposite thereto. According to such aspect, the usage efficiency of the light of the light source enhances since the height of the light incident end face that faces the light source can be increased.

In these embodiments, the directivity conversion unit for enclosing the light entered to the light introducing section from the light incident end face in the light guide substrate by narrowing the directivity spread in the thickness direction of the light guide substrate of the light entered to the light introducing section is desirably arranged at the surface on the light exit side of the light introducing section or at the surface on the opposite side. With the arrangement of the directivity conversion unit, the light that leaks from the light guiding section and the like after being reflected at the reverse tapered portion can be reduced. More specifically, the directivity conversion unit is configured by a plurality of directivity conversion patterns of V groove shape. In the directivity conversion unit configured by the directivity conversion patterns of V groove shape, a vertex angle of a hill portion at a cross-section perpendicular to a ridge line of the hill portion formed by the adjacent directivity conversion patterns is desirably greater than or equal to 107° and smaller than or equal to 154°. If the vertex angle of the hill portion is greater than or equal to 107° and smaller than or equal to 154°, satisfactory directivity conversion efficiency and light guiding efficiency of the light guide plate can be obtained. The hill portion is the portion projecting out from the light guide substrate, and the vertex angle of the hill portion is the narrow angle formed by the surfaces sandwiching the ridge line.

More specifically, when the light source is a point light source, the directivity conversion unit is configured by a plurality of directivity conversion patterns radially arrayed with the point light source or a certain position near the point light as a center.

In this aspect, if the light source is a point light source, when seen from a direction perpendicular to the light exit surface of the light guide plate, an angle formed by a direction extended from an arbitrary point on an edge on the side close to the point light source of the directivity conversion unit to one end of a light exit window of the point light source and a direction extended from the arbitrary point to a middle of the light exit window is preferably smaller than or equal to 32°; and an angle formed by a direction extended from an arbitrary point on an edge on the side close to the point light source of the directivity conversion unit to the other end of the light exit window of the point light source and a direction extended from the arbitrary point to the middle of the light exit window is preferably smaller than or equal to 32°. According to such aspect, satisfactory directivity conversion efficiency and light guiding efficiency of the light guide plate can be obtained.

Furthermore, in the relevant aspect, the point light source is arranged in plurals along an end edge of the light guide plate; and the directivity conversion unit corresponding to the point light source is positioned inside a region simultaneously satisfying three equations of $X>0$ $X \leq \{-2Y+(2P-W)\}/(2 \tan \alpha)$ $X \leq \{2Y+(2P-W)\}/(2 \tan \alpha)$ (where P: distance between the point light sources, W: width of light exit window of the point light source, and $\alpha$: angle expressed as $\alpha = \arcsin(1/ng)$ where ng is index of refraction of the light guide plate), assuming an X-axis is defined in a direction passing a center of one of an arbitrary point light source and being perpendicular to the end edge of the light guide plate and Y-axis is defined along the end edge of the light guide plate when seen from the direction perpendicular to the light exit surface of the light guide plate. According to such aspect, in an area light source device in which a plurality of point light sources are arranged along the end edge of the light guide plate and the respective directivity conversion unit is arranged on the front side of each point light source, the light from another non-corresponding point light source is avoided from entering and reflected or transmitted to the respective directivity conversion unit, and the leakage of light from the directivity conversion unit and the light introducing section can be reduced.

In accordance with another further aspect of the present invention, the inclination angle ω of the tapered portion measured from a plane parallel to the light exit surface is desirably the following, where ng is the index of refraction of the light guide substrate and n1 is the index of refraction of the low refraction index layer. If such condition is met, the light reflected at the tapered portion is less likely to leak from between the light guide substrate and the low refraction index layer.

$$\arctan\left(\frac{n1 - \sqrt{ng^2 - 1}}{1 + \sqrt{ng^2 - n1^2}}\right) \leq \omega \leq \arctan\left(\frac{ng - n1}{\sqrt{ng^2 - n1^2}}\right)$$

In another further aspect of the first or second area light source device according to one or more embodiments of the present invention, the surface on the light exit surface side of the reflection layer includes a plurality of inclined surfaces or the light exit unit. In this aspect, an angle formed by the adjacent inclined surfaces is desirably greater than or equal to 107° and smaller than or equal to 136°. If the angle formed by the adjacent inclined surfaces is within such range, the ratio of the total light amount of the light exit in the direction within ±20° with respect to the total light amount of the light exit in the direction within ±90° with respect to the normal line of the light exit surface 44 becomes greater than or equal to 60%.

In another further aspect of the first or second area light source device in one or more embodiments of the present invention, the light control pattern is configured by a projection pattern or a recess pattern formed at the light exit surface, an angle formed by a surface for reflecting the light at the projection pattern or the recess pattern and the light exit surface preferably being smaller than or equal to 20°.

In accordance with still another further aspect of the present invention, a liquid crystal display device according to one or more embodiments of the present invention includes embodiments of the area light source device of the present invention, a liquid crystal panel, and at least one connection layer, interposed at least between the light guide plate main body of the area light source device and the liquid crystal panel, for closely attaching the light guide plate main body to the liquid crystal panel; wherein an index of refraction of one of the connection layer is lower than an index of refraction of the light guide plate main body. In such liquid crystal display device, the area light source device is attached to the liquid crystal panel with the connection layer of low refraction index, and hence the warp of the area light source device and the like can be prevented even in the case of thin area light source device. In addition, the light is prevented from directly leaking to the connection layer, higher luminance can be realized for the display surface of the liquid crystal display device and even luminance distribution can be achieved by using the area light source device of the present invention for the area light source device.

In accordance with one or more embodiments of the invention, characteristics in which the configuring elements described above are appropriately combined, and the present invention includes a great number of variations realized by combining the configuring elements.

DETAILED DESCRIPTION

Hereinafter, embodiments of the present invention will be described with reference to the accompanied drawings.

Figure 8:
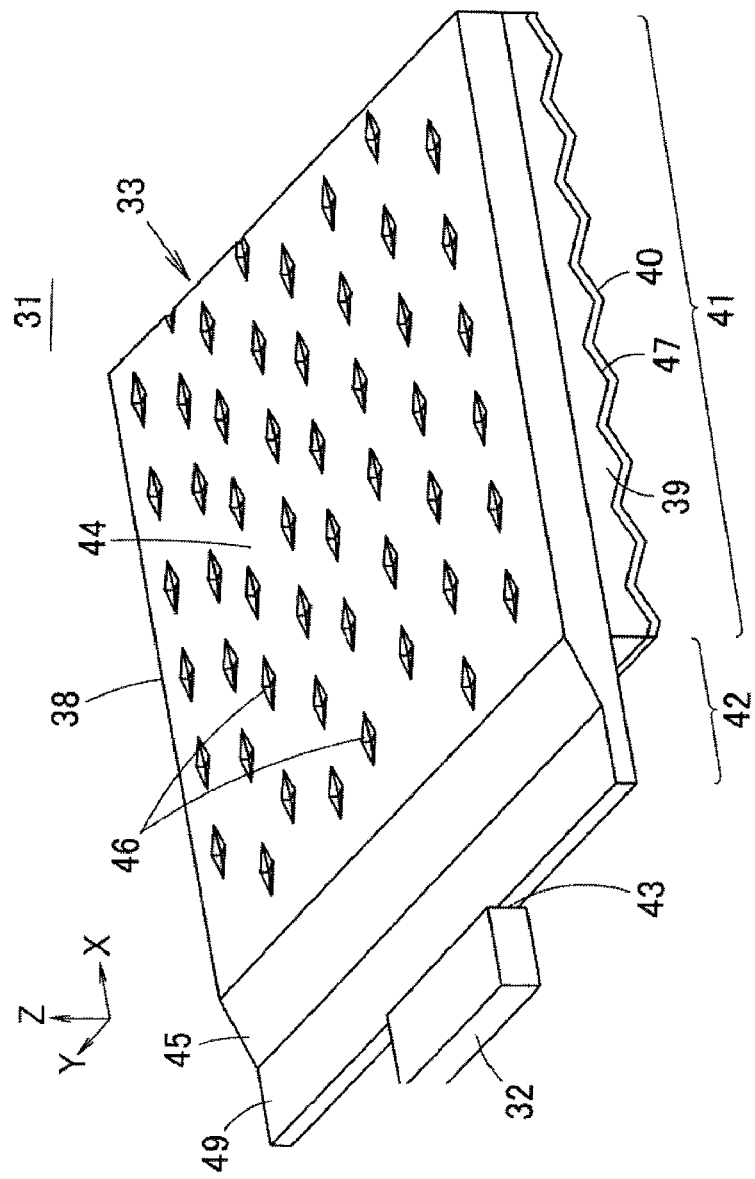
FIG. 8 is a perspective view of an area light source device according to a first embodiment of the present invention seen from a light exit surface side.
Figure 9:
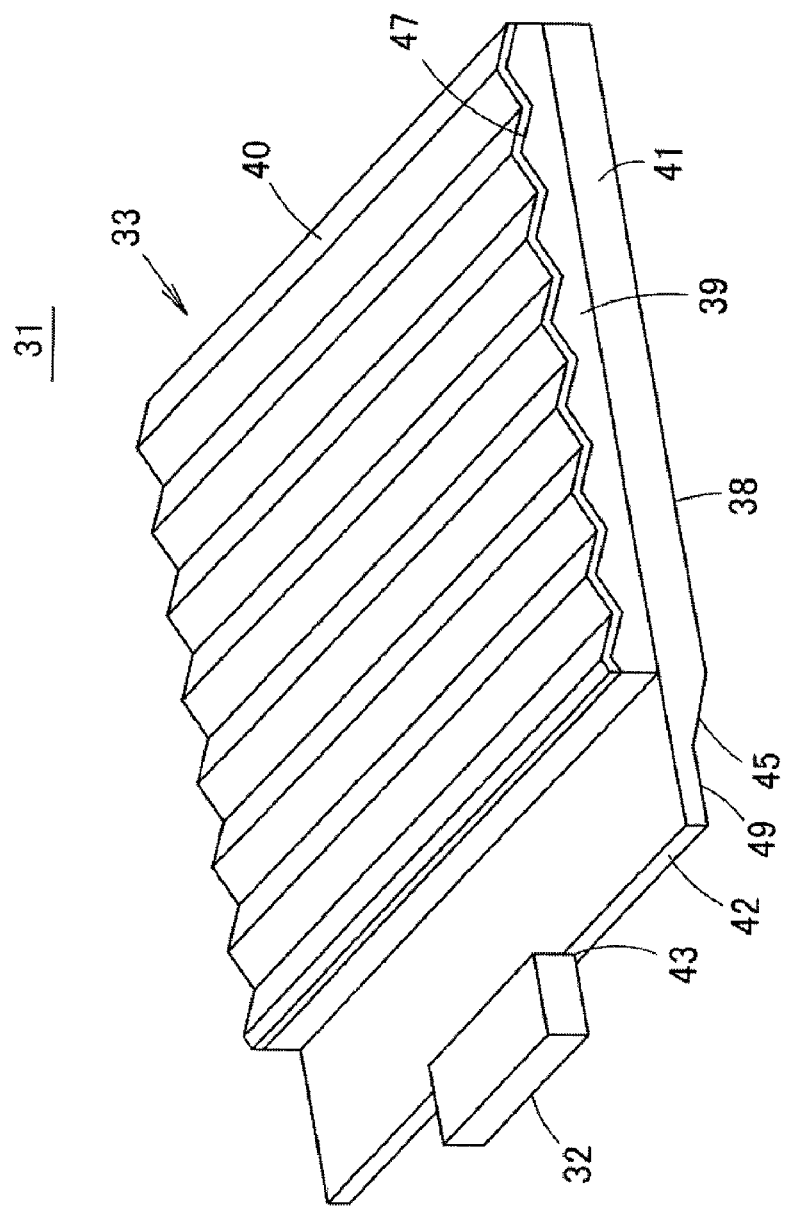
FIG. 9 is a perspective view of the area light source device according to the first embodiment seen from the side opposite to the light exit surface.
Figure 10:
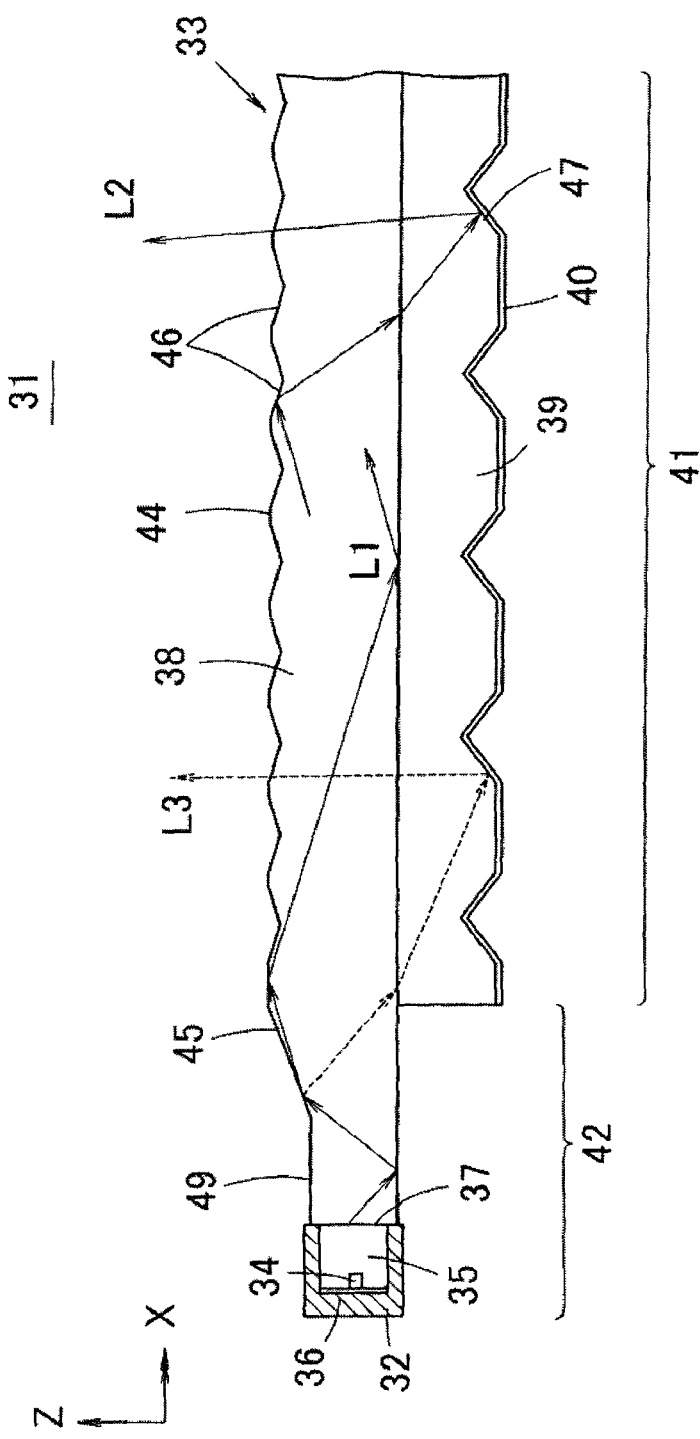
FIG. 10 is a partially broken plan view of the area light source device of the first embodiment.

The structure of an area light source device 31 according to a first embodiment of the present invention will be described below with reference to FIG. 8 to FIG. 12. FIGS. 8 and 9 are perspective views showing the structure on the front surface side and the back surface side of the area light source device 31. FIG. 10 is a partially broken plan view of the area light source device of the first embodiment.

The area light source device 31 includes a point light source 32 and a light guide plate 33. The point light source 32 incorporates one or a plurality of proximate LEDs, and emits a white light. As shown in FIG. 10, for example, the point light source 32 has one or a plurality of LEDs 34 sealed in a transparent sealing resin 35, and further has each surface excluding the front surface of the transparent sealing resin 35 covered with a white resin 36. The front surface of the transparent sealing resin 35 is exposed from the white resin 36, and becomes a light exit window 37. The light exit from the LED 34 is directly exit from the light exit window 37 or exit from the light exit window 37 after being reflected at the boundary of the transparent sealing resin 35 and the white resin 36.

The point light source 32 is not limited to that shown in FIG. 10. The point light source 32 referred to herein is not the point light source in a strict sense, and is the point light source referred to as opposed to the cold cathode tube being called the linear light source. In other words, the point light source is the light source that is small compared to the width of the light guide plate 33, where the point light source 32 also has a finite width but does not have the length or the width of greater than or equal to 10 mm as in the cold cathode tube.

For instance, another point light source 32 may be a side view type LED. In the side view type LED, one or more LED chips are arranged in one package, and a plurality of LED chips may be simultaneously sealed. The width of the exit window sometimes becomes about 5 mm if the plurality of LED chips are simultaneously sealed, but this is also considered the point light source since it is sufficiently small compared to the width of the light emission region of the light guide plate of about two inches. The light guided by using the optical fiber may be introduced to the light guide plate. In such a case, the light exit end face of the optical fiber can be considered the point light source.

The light guide plate 33 includes a low refraction index layer 39 made from a translucent material having a smaller index of refraction than a light guide substrate 38 at a lower surface of the light guide substrate 38 made from a translucent material, and has a reflection layer 40 formed by a metal thin film, and the like at the lower surface of the low refraction index layer 39. The light guide substrate 38 can be conceptually divided to a light guide plate main body 41 and a light introducing section 42. The light introducing section 42 is arranged at the end on the light source side of the light guide plate main body 41, and the light introducing section 42 and the light guide plate main body 41 are integrally and continuously shaped. The light guide substrate 38 is shaped by a transparent resin having high index of refraction or a glass having high index of refraction such as polycarbonate resin (PC), acrylic resin, cycloolefin material, and polymethyl methacrylate (PMMA), where the index of refraction is preferably 1.5 to 1.6. The thickness of the light guide substrate 38 is about 0.3 mm to 0.5 mm. The thickness of the end face (light incident end face 43) of the light introducing section 42 is made thicker than the height of the light exit window 37 of the point light source 32, so that the light exit from the point light source 32 can be efficiently entered to the light introducing section 42 from the light incident end face 43, and the light usage efficiency of the area light source device 31 is enhanced. However, the thickness of the end face of the light introducing section 42 is preferably equal to the height of the light exit window 37 of the point light source 32 since the light guide substrate 38 is desired to be as thin as possible.

In the light introducing section 42, a tapered portion 45 for light control is formed on the surface (front surface) on the same side as the light exit surface 44 of the light guide plate main body 41. The tapered portion 45 is formed in a rectangular band-shaped region extending in parallel to the light incident end face 43 at a region adjacent to the light guide plate main body 41 in the light introducing section 42. In other words, when seen from a direction perpendicular to the light exit surface 44 of the light guide plate 38, the region from the edge positioned on the far side from the point light source 32 of the tapered portion 45 to the light incident end face 43 is called the light introducing section 42, and the other region (region from the edge positioned on the far side from the point light source 32 of the tapered portion 45 to the end face on the opposite side of the light exit end face 43 of the light guide plate 33) is called the light guide plate main body 41. In the present embodiment, both the front and back surfaces of the light introducing section 42 including the tapered portion 45 are smoothly formed. The tapered portion 45 may be arranged on the surface (back surface) on the side opposite to the light exit surface 44 of the light introducing section 42 or may be arranged on both front and back surfaces, but a case of being arranged only on the front surface will be described below.

The tapered portion 45 is inclined such that the thickness of the light introducing section 42 becomes greater the farther away from the light incident end face 43. The normal direction of the tapered portion 45 is within a plane perpendicular to the light incident end face 43 and the light exit surface 44. The thickness of a thin plate portion 49 adjacent on the light source side of the tapered portion 45 is thinner than the thickness of the light guide plate main body 41 adjacent to the side opposite to the light source of the tapered portion 45.

A great number of microscopic diffusion patterns 46 (light control pattern) for totally reflecting the light guided from the light source side and changing the light guiding direction of the light is arranged at the light exit surface 44 of the light guide plate main body 41. The diffusion patterns 46 are regularly arranged in FIG. 9, but may be randomly arranged. Alternatively, a general arrangement method such as arranging the diffusion patterns 46 in a zigzag manner so that evenness of luminance is obtained within the surface of the light exit surface 44, or radially (concentrically) arraying the diffusion patterns 46 may be used. As the reaching amount of light reduces the farther away from the point light source 32, the distribution density or the number density of the diffusion patterns 46 desirably becomes larger the farther away from the point light source 32 to achieve evenness in the light emission luminance of the area light source device 31.

The back surface of the light guide plate main body 41 is smooth and is formed parallel to the light exit surface 44. A low refraction index layer 39 made of a transparent resin having a lower index of refraction than the light guide plate main body 41 is formed at the back surface of the light guide plate main body 41 so as to closely attach to the back surface of the light guide plate main body 41 without interposing an air layer. The low refraction index layer 39 is shaped from a transparent resin or a glass such as polymethyl methacrylate (PMMA), polycarbonate resin (PC), acrylic resin, and cycloolefin material. The low refraction index layer 39 desirably has a lower index of refraction than the light guide plate main body 41 and a relatively high index of refraction, and thus a material having an index of refraction of greater than or equal to 1.4 and smaller than 1.5 is preferred. A specific example includes that in which the low refraction index layer 39 made of polymethyl methacrylate is formed at the lower surface of the light guide substrate 38 made of polycarbonate resin. The thickness of the low refraction index layer 39 is about 5 μm. A microscopic deflection pattern 47 (light exit unit) for reflecting the light entered to the lower surface of the low refraction index layer 39 from the diagonal direction and exiting in a direction substantially perpendicular to the light exit surface 44 is formed at the lower surface of the low refraction index layer 39. The deflection pattern 47 is formed as a projection having a triangular cross-section (prism-shape) and extends long in the width direction of the light guide substrate 38, and is arrayed in a line in a direction perpendicular to the light incident end face 43. In FIG. 8 and FIG. 9, the deflection pattern 47 is arrayed without space, but may be discretely arranged with an interval. In such a case, the deflection pattern 47 may be a recess-form or a projection-form, or a combination of the recess-form and the projection form. The deflection pattern 47 may be formed by a plane or may be formed by a curved surface.

Furthermore, the reflection layer 40 made from a metal vapor deposition film such as Ag or Al or white resin coating is formed over the entire surface of the lower surface of the low refraction index layer 39 so as to cover the deflection pattern 47, so that the low refraction index layer 39 and the reflection layer 40 configure a back surface mirror.

In accordance with one or more embodiments, the behavior of the light in the area light source device 31 having the above-described structure and the effect thereof will be described with reference to FIG. 10 and FIG. 11. In the following, the direction perpendicular to the light incident end face 43 of the light guide substrate 38 is the X-direction, the direction perpendicular to the light exit surface 44 is the Z direction, and the direction orthogonal to the X direction and the Z direction is the Y-direction.

FIG. 10 shows the behavior of the light in the area light source device 31 in accordance with one or more embodiments of the invention. FIG. 11 is a view describing the change in directional characteristics of the light in the light guide plate 33 in accordance with one or more embodiments of the invention. The directional characteristic P1 shown in FIG. 11 represents the directional characteristic immediately after the light of the point light source 32 entered the light introducing section 42. Assuming the index of refraction of the light guide substrate 38 is ng, the directivity spread immediately after entering the light introducing section 42 can be expressed as $\pm\alpha = \pm\arcsin(1/ng)$ (Equation 1), where the directional spread of the directional characteristic P1 is $\pm\alpha = \pm 39.0°$ if ng=1.59.

If the index of refraction ng of the light guide substrate 38 is 1.59, the critical angle of total reflection at the boundary of the thin plate portion 49 or the back surface thereof and the air layer is also 39.0°, which is 51.0° when converted to an angle measured from the horizontal direction (X-axis direction). In other words, the light of an angle greater than or equal to 51.0° measured from the horizontal direction and the light of an angle smaller than or equal to −51.0° leak from the boundary of the light introducing section 42 and the air layer. However, since the directivity spread of the light that entered the light introducing section 42 is ±39.0°, the light that entered the light introducing section 42 does not leak at the boundary with the air, and is guided through the light introducing section 42 while being totally reflected.

Figure 1:
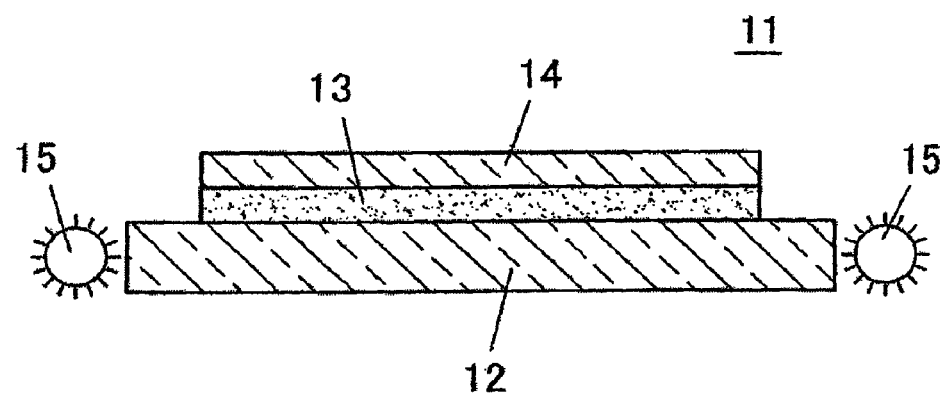
FIG. 1 is a schematic cross-sectional view showing a liquid crystal display device of a first comparative example disclosed in Japanese Unexamined Patent Publication No. 5-88174.
Figure 2A:
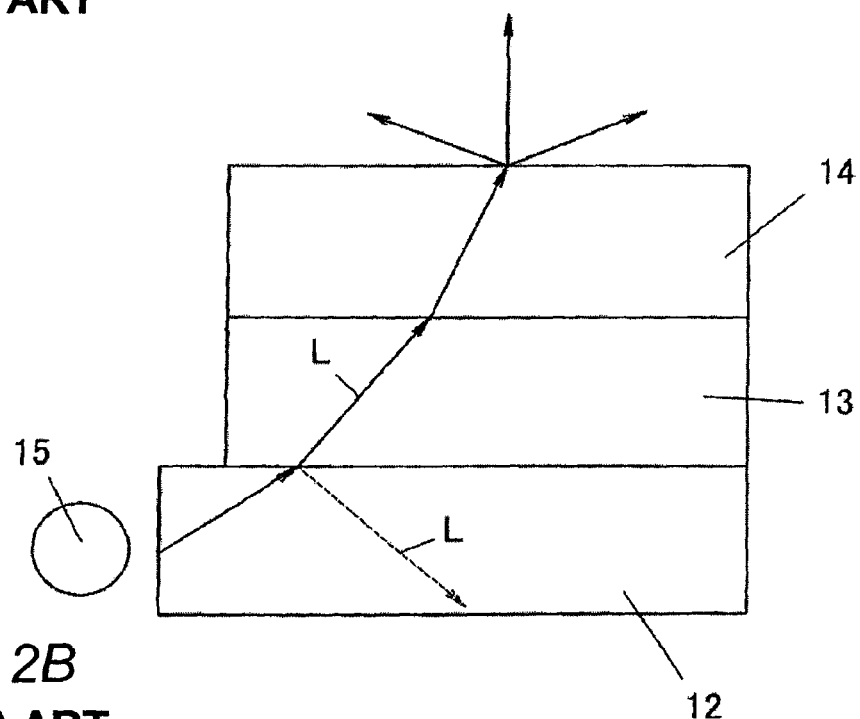
FIG. 2A is a view showing the behavior of light that entered into a light guide plate of the liquid crystal display device of FIG. 1.
Figure 2B:
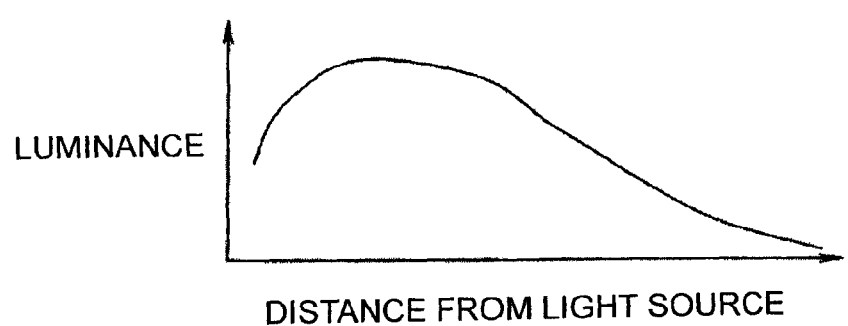
FIG. 2B is a view describing the state in which the luminance of the liquid crystal display device changes according to the distance from the light source.
Figure 3:
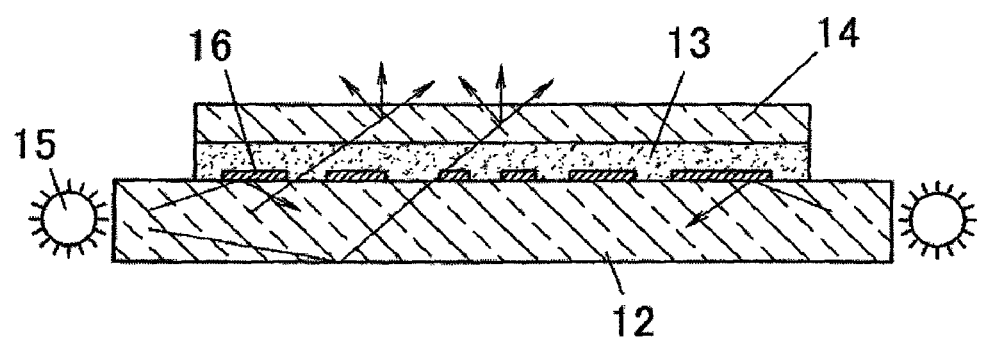
FIG. 3 is a schematic cross-sectional view showing a liquid crystal display device of a first example described in Japanese Unexamined Patent Publication No. 5-88174.
Figure 4:
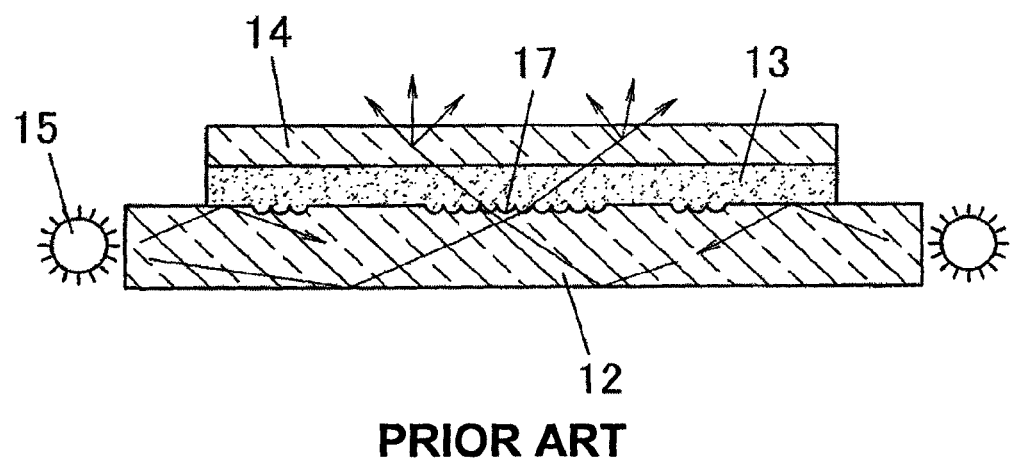
FIG. 4 is a schematic cross-sectional view showing a liquid crystal display device of a second example described in Japanese Unexamined Patent Publication No. 5-88174.
Figure 5B:
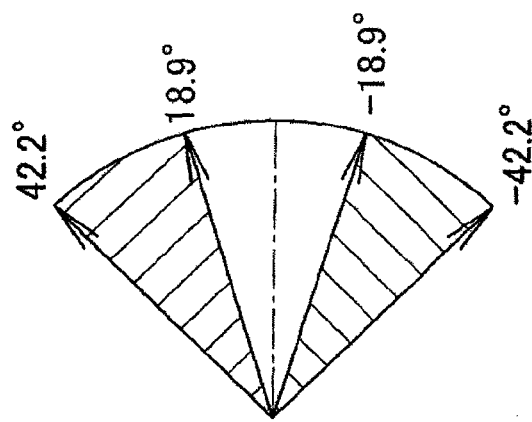
FIG. 5B is a view showing a region of light that transmits through an boundary with a thin film of the light that entered the light guide plate.
Figure 5A:
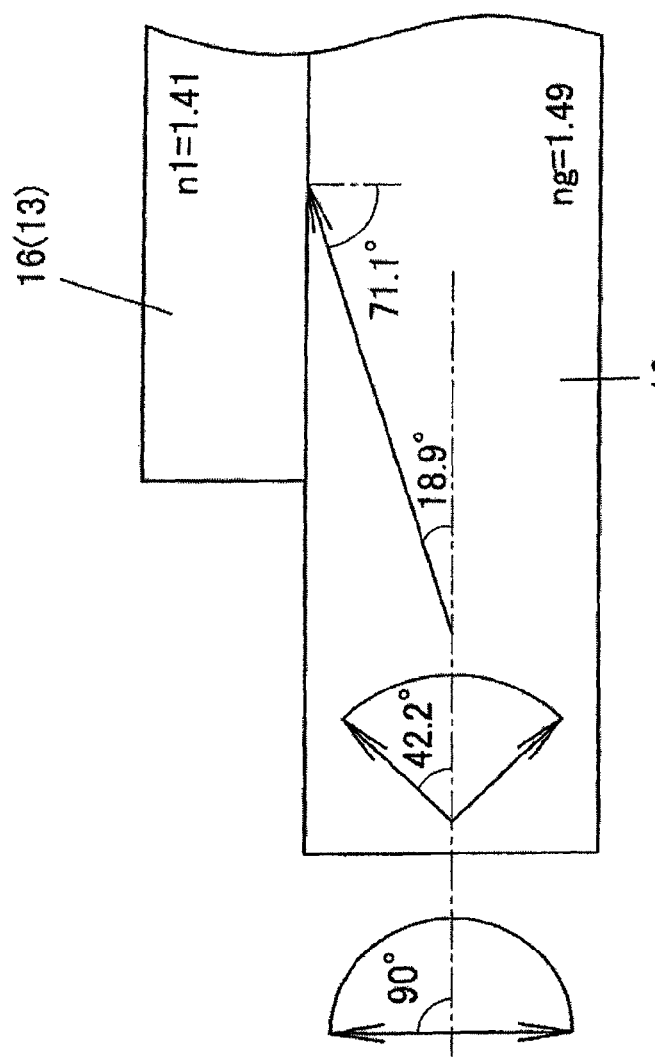
FIG. 5A is a view showing the directivity of light in the light guide plate in the liquid crystal display device shown in FIG. 3.
Figure 6:
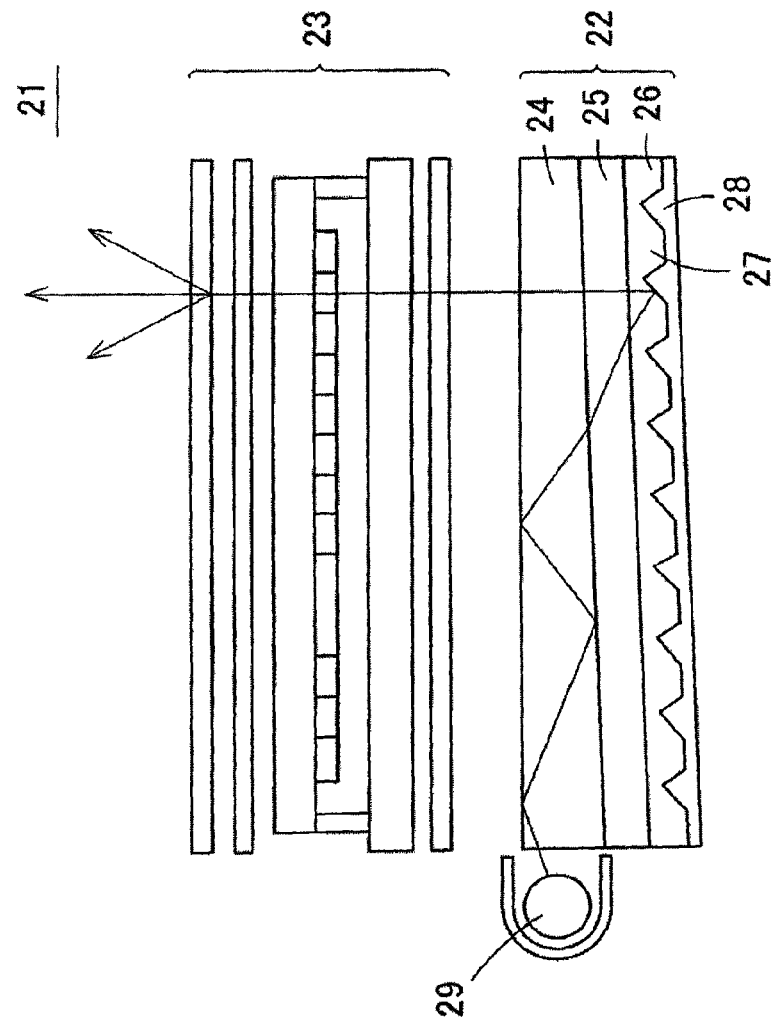
FIG. 6 is a schematic cross-sectional view of a liquid crystal display device disclosed in Japanese Unexamined Patent Publication No. 2001-110218.
Figure 7:
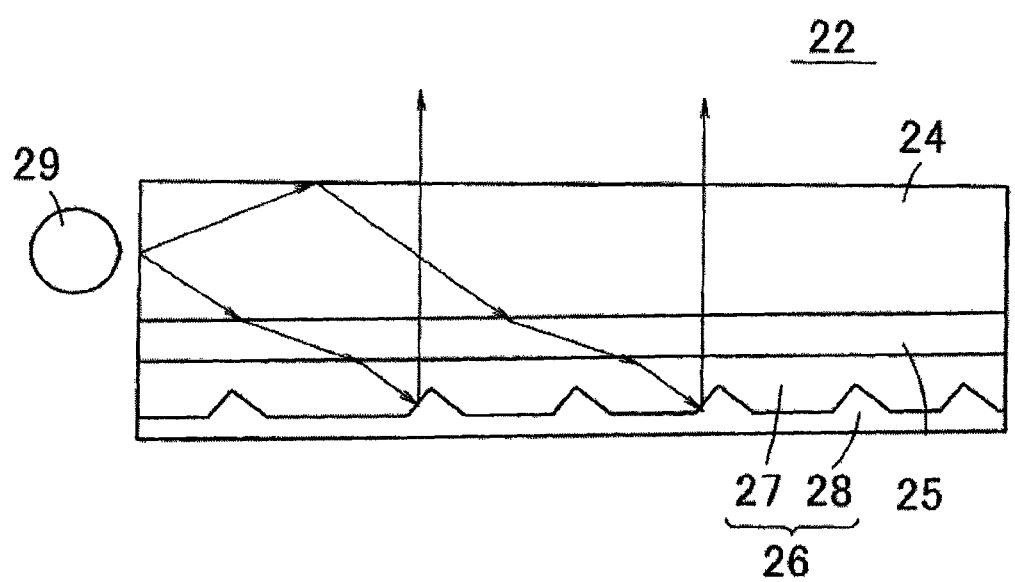
FIG. 7 is a view showing the behavior of light in the area light source device used in the liquid crystal display device of Japanese Unexamined Patent Publication No. 2001-110218.
Figure 11:
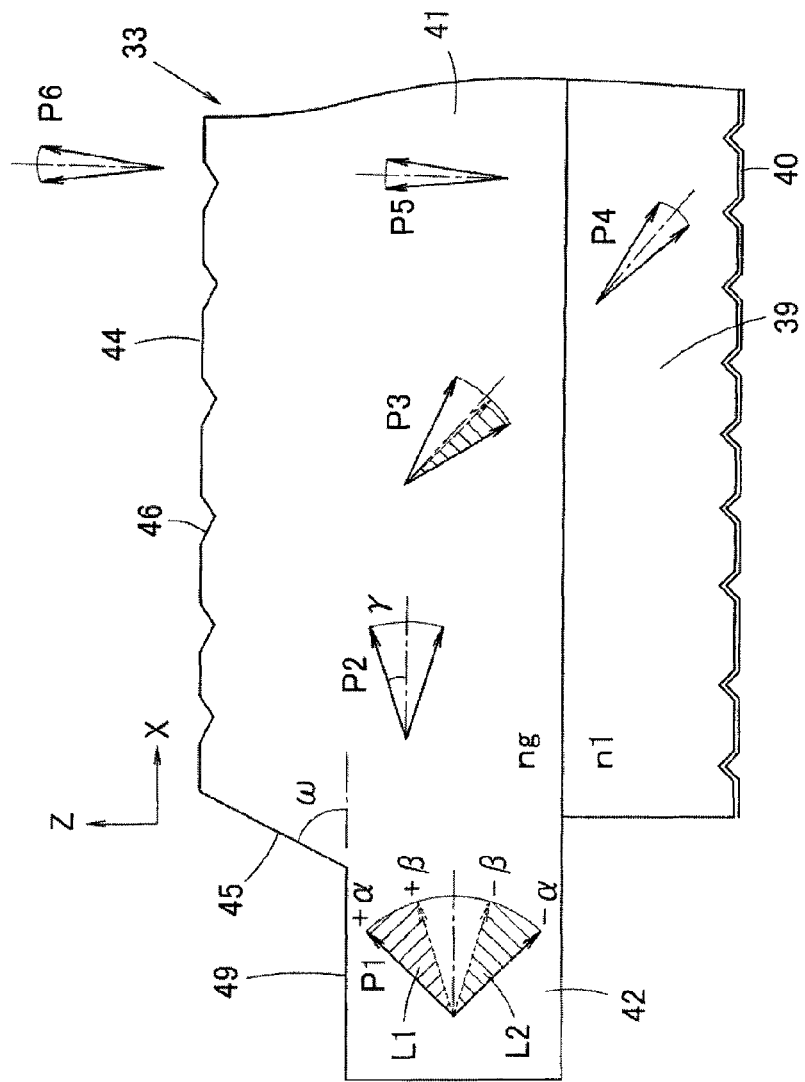
FIG. 11 is a view describing the change in directional characteristics of the light in the light guide plate.

The light of the shaded region of the directional characteristic P1 immediately leaks to the low refraction index layer 39 side when arriving at the boundary of the light guide plate main body 41 and the low refraction index layer 39, and then is reflected at the reflection layer 40, and exit from the light exit surface 44 as with the light L3 shown with a broken arrow in FIG. 11 if the tapered portion 45 is not arranged. The light outside of the shaded region of the directional characteristic P1 is the light totally reflected at the boundary with the low refraction index layer 39. In other words, the light of the shaded region of the directional characteristic P1 corresponds to the light in the shaded region of FIG. 5B. The light beams L1, L2 shown in FIG. 10 both represent the light in the shaded region at the directional characteristic P1 of FIG. 11, and are factors that light up the vicinity of the point light source of the light exit surface 44 and cause luminance unevenness as with the light L3 of the broken arrow if the tapered portion 45 is not arranged.

Assuming the index of refraction of the light guide substrate 38 is ng and the index of refraction of the low refraction index layer 39 is n1, the critical angle γ of total reflection at the boundary of the light guide plate main body 41 and the low refraction index layer 39 becomes $\gamma = \arcsin(n1/ng)$ (Equation 2) which can be converted to an angle β measured from the horizontal direction as $\beta = 90° - \gamma = 90° - \arcsin(n1/ng)$. (Equation 3) If ng=1.59 and n1=1.4, β=28.3°.

Therefore, the light in the range of −β to +β (light outside of the shaded region) of the light having the directivity spread $\pm\alpha(=\pm 39.0°)$ that entered the light introducing section 42 is totally reflected at the boundary of the light introducing section 42 and the air, and at the boundary of the light guide plate main body 41 and the low refraction index layer 39, and is guided without leaking from the light guide substrate 38. On the other hand, the light L2 in the range of −α to −β and the light L1 in the range of +β to +α (light of the shaded region) are totally reflected at the boundary with the air if the tapered portion 45 is not arranged, but are transmitted through the boundary with the low refraction index layer 39 and leak from the light exit surface 44.

In the area light source device 31, such lights L1, L2 are reflected at the tapered portion 45 to convert the directional characteristics, so that the lights are enclosed in the light guide plate main body 41. Describing the directional characteristics, the directional characteristic P1 of immediately after entering the light introducing section 42 has the spread in the cross-section perpendicular to the light exit surface 44 narrowed when the light is reflected at the tapered portion 45. In other words, the directivity spread γ of the light having the directional characteristic P2, which is narrowed in the tapered portion 45, is reduced to about the directivity spread β of the light outside of the shaded region at the directional characteristic P1 (preferably γ≦β). When the directional characteristic P2 is the narrow directional characteristic outside of the shaded region of the directional characteristic P1, the light (directional characteristic P2) after being reflected at the tapered portion 45 is totally reflected at the boundary of the light guide plate main body 41 and the low refraction index layer 39, and is guided through the light guide plate main body 41 while repeating total reflection at the front surface (light exit surface 44) and the back surface (boundary with low refraction index layer 39) of the light guide plate main body 41 as long as it is not reflected at the diffusion pattern 46 as with the light L1 shown in FIG. 10.

After the light enclosed in the light guide plate main body 41 is totally reflected at the diffusion pattern 46, such light advances downward, and hence the direction of the directional characteristic P2 changes to the directional characteristic P3. The light outside of the shaded region in the directional characteristic P3 represents the light having an incident angle greater than the critical angle of total reflection at the boundary with the low refraction index layer 39. The light outside of the shaded region of the light of the directional characteristic P3 is totally reflected at the boundary with the low refraction index layer 39 but the light in the shaded region enters the low refraction index layer 39 as with the light L2 of FIG. 11. Therefore, the directional characteristics of the light that entered the low refraction index layer 39 become narrow as with P4. Such light of narrow directional characteristic is reflected at the reflection layer 40 and advances towards the light exit surface 44 (directional characteristic P5), and is further exit to the outside from the light exit surface 44 (directional characteristic P6) as with the light L2 of FIG. 10.

As a result, according to the area light source device 31, the light guided through the light guide plate main body 41 can be accurately controlled by arranging the tapered portion 45, and the light in the shaded region of the directional characteristic P1 is prevented from leaking from the light exit surface 44 in the vicinity of the point light source 32. Therefore, the luminance unevenness of the light emitting surface can be reduced, the luminance of the light exit surface 44 can be evened, and the luminance can be enhanced over the entire light exit surface 44.

Moreover, since the low refraction index layer 39 and the reflection layer 40 are arranged at the lower surface of the light guide plate main body 41, one part of the light, which directional characteristics are narrowed by being reflected at the tapered portion 45, passes the boundary of the light guide plate main body 41 and the low refraction index layer 39 thereby further narrowing the directional characteristics. As a result, the directional characteristics of the light exit from the light exit surface 44 become narrow and the luminance of the front surface of the area light source device 31 is enhanced.

Therefore, according to the area light source device 31, the directional characteristics of the light guided through the light guide plate main body 41 can be narrowed by the tapered portion 45, and the leakage of light in the vicinity of the point light source can be prevented. As a result, the evenness of the luminance distribution at the light emitting surface can be enhanced and the luminance of the light emitting surface can be enhanced by enhancing the usage efficiency of the light. Furthermore, the directional characteristics of the light exit from the light exit surface 44 can be more narrowed by transmitting one part of the light, which directional characteristics are narrowed by the tapered portion 45, to the low refraction index layer 39, and the front surface luminance of the area light source device 31 can be enhanced. The controllability of the light by the diffusion pattern 46 and the deflection pattern 47 also increase by narrowing the directivity of the light in the light guide plate main body 41 by means of the tapered portion 45. Thus, according to the area light source device 31, a back light having narrow directivity, high luminance and capable of emitting light evenly can be realized. Furthermore, an additional sheet such as a prism sheet may be omitted, in which case, the area light source device 31 or the liquid crystal display device can be thinned.

Figure 12A:
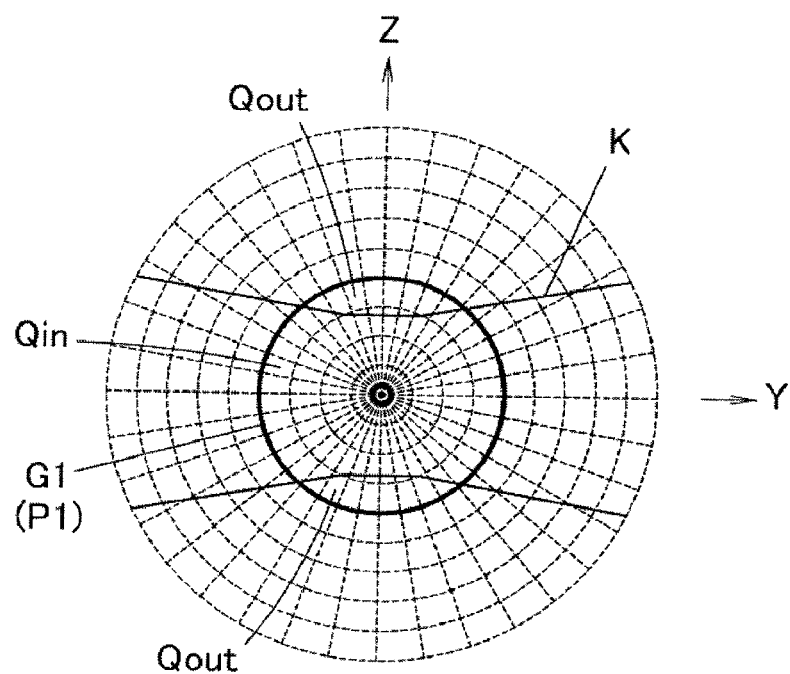
FIGS. 12A and 12B show the change in directional characteristics at before and after being reflected at the tapered portion.
Figure 12B:
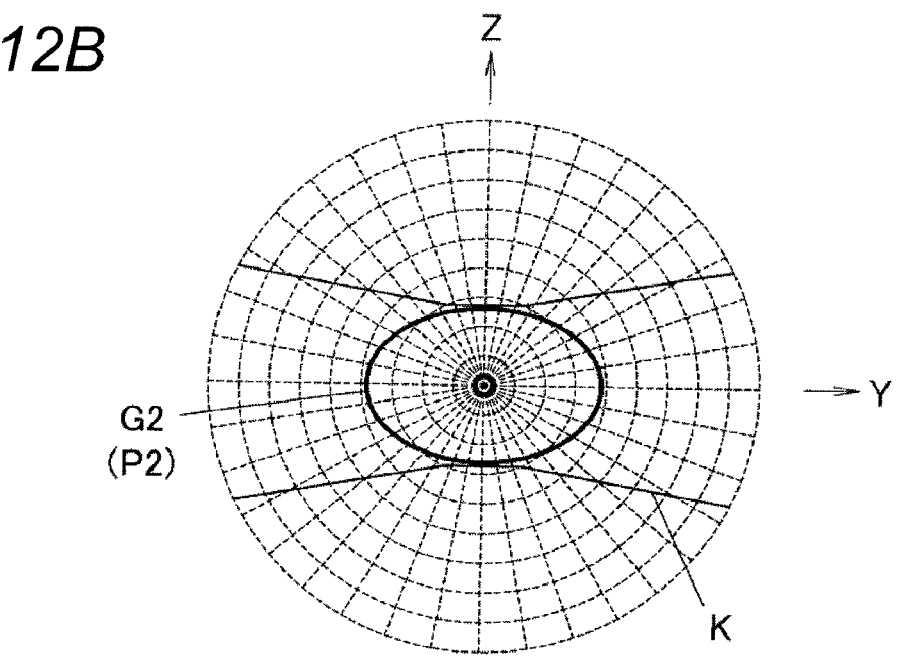

(Regarding tapered portion) The operation of the tapered portion 45 in accordance with one or more embodiments of the invention will now be described. When the light is totally reflected at the tapered portion 45 as shown with the light L1 in FIG. 10, the direction of the light after the reflection becomes close to the horizontal direction (XY plane) than the light before entering, and as a result, the directivity spread in the thickness direction of the light guide substrate 38 becomes narrower as with the directional characteristics P2 of the light after the reflection, as shown in FIG. 11. FIGS. 12A and 12B show the change in directional characteristics at the tapered portion 45 when seen from the X direction in accordance with one or more embodiments of the invention. The directional characteristics G1 of FIG. 12A represent the directional characteristics of the light that entered the light introducing section 42. In other words, this is when the directional characteristics of circular cone shape having a directivity spread of α=39.0° (when index of refraction of the light guide substrate 38 is 1.59), that is, the directional characteristics P1 of FIG. 11 is seen from the X direction. The boundary K in FIGS. 12A and 12B represents the boundary of the light that leaks from the boundary of the light guide substrate 38 (index of refraction 1.59) and the low refraction index layer 39 (index of refraction 1.4). That is, the light between the upper and lower boundaries K is enclosed in the light guide substrate 38, and the light above the upper boundary K and the light below the lower boundary K leak from the boundary with the low refraction index layer 39. Therefore, if the light of the directional characteristic G1 that entered the light introducing section 42 reached the boundary of the light guide substrate 38 and the low refraction index layer 39 without the directional characteristics converted, the light (light in the region Qin in FIG. 12A) between the upper and lower boundaries K of the light of the directional characteristic G1 is enclosed in the light guide substrate 38, but the light (light in the region Qout in FIG. 12A) other than between the boundaries K leaks towards the low refraction index layer 39 as with the light L3 of FIG. 10 thereby brightly lighting the light exit surface 44.

In order to eliminate the leakage of light, the directional characteristics G1 are to be converted at the tapered portion 45 before the light reaches the boundary with the low refraction index layer 39 so as to be entirely between the boundaries K as with the directional characteristics G2 in FIG. 12B. According to a simulation, when the index of refraction of the light guide substrate 38 is ng=1.59 and the index of refraction of the low refraction index layer 39 is n1=1.4, the inclination angle ω (see FIG. 11) of the tapered portion 45 measured from the horizontal direction is 5.3° so that the directivity spread is β=28.3°, as described above. The directional characteristic P2 of FIG. 11 is the directional characteristic converted in such manner.

Generally, when the index of refraction of the light guide substrate 38 is ng and the index of refraction of the low refraction index layer 39 is n1, the inclination angle w of the tapered portion 45 is to satisfy the following equation 4 in order to convert the directivity at the tapered portion 45 so that light entering the light introducing section 42 has the directional characteristic that does not leak towards the low refraction index layer 39 side at the boundary of the light guide substrate 38 and the low refraction index layer 39.

$$\arctan\left(\frac{n1 - \sqrt{ng^2 - 1}}{1 + \sqrt{ng^2 - n1^2}}\right) \leq \omega \leq \arctan\left(\frac{ng - n1}{\sqrt{ng^2 - n1^2}}\right) \quad \text{(Equation 4)}$$

For instance, if the index of refraction ng of the light guide substrate 38 is 1.59 and the index of refraction n1 of the low refraction index layer 39 is 1.4, 5.3°≤ω≤14.2° is obtained from equation 4, where the directivity in the Z direction (directivity in vertical direction) of the light guide substrate 38 is within ±28.3° if the inclination angle w of the tapered portion 45 is greater than or equal to 5.3° and smaller than or equal to 14.2°, and hence the light does not leak towards the low refraction index layer 39. Furthermore, only the directivity in the Z direction becomes narrow and the directivity in the Y direction (directivity in the horizontal direction) barely spreads, whereby the optical path from the point light source 32 becomes substantially linear, the designing of the diffusion pattern 46 and the deflection pattern 47 is facilitated, and the luminance can be easily evened.

The tapered portion 45 may start from the light incident end face 43 and the thin plate portion 49 may not be arranged, and may start from a position slightly distant from the light incident end face 43.

(Regarding diffusion pattern) The diffusion pattern 46 formed at the light exit surface 44 in accordance with one or more embodiments of the invention will now be described. The diffusion pattern 46 acts to bend the optical path so that the incident angle with respect to the lower surface of the light guide plate main body 41 becomes small by totally reflecting the light guided into the light guide plate main body 41. The diffusion pattern 46 shown in FIG. 8 is recessed to a diamond shape, but problems do not particularly arise even if the shape of the last half positioned on the side distant from the point light source 32 is of any shape since the light is reflected at the first half close to the point light source 32 when the diffusion pattern 46 has a recessed shape. The first half of the diffusion pattern 46 needs to reflect the light and transmit the light from the light guide plate main body 41 to the low refraction index layer 39, and needs to narrow the directivity spread of the light transmitted from the light guide plate main body 41 to the low refraction index layer 39 as much as possible. To this end, the inclination angle ε of the first half positioned on the side close to the point light source 32 of the diffusion pattern 46 is preferably 0°<ε≦20°. The inclination angle is desirably 0°<ε≦10° and more preferably 0°<ε≦5°. However, the peak direction of the light passing towards the low refraction index layer 39 can be controlled by the combination of the inclination angle ε of the diffusion pattern 46 and the refraction index ratio of the index of refraction of the light guide substrate 38 and the index of refraction of the low refraction index layer 39, and hence the value of the most suitable inclination angle ε needs to be determined in view of the refraction index ratio of the light guide substrate 38 and the low refraction index layer 39.

The diffusion pattern 46 does not need to have the first half and the last half symmetrical to each other and merely needs to have the inclination angle ε of the first half in the above range, and thus the first half and the last half may be asymmetrical. In particular, the cross-section may be an unequal triangular shape (see FIG. 37). The diffusion pattern 46 may also project out from the light exit surface 44 (see FIG. 26). In the case of the diffusion pattern 46 of projection shape, the light guided to the light guide plate main body 41 is totally reflected at the last half of the diffusion pattern 46. In such a case, the inclination angle ε of the last half is to be in the above range. Furthermore, the diffusion pattern 46 may be configured with curved surfaces as in a dome shape (spherical shape).

Figure 13:
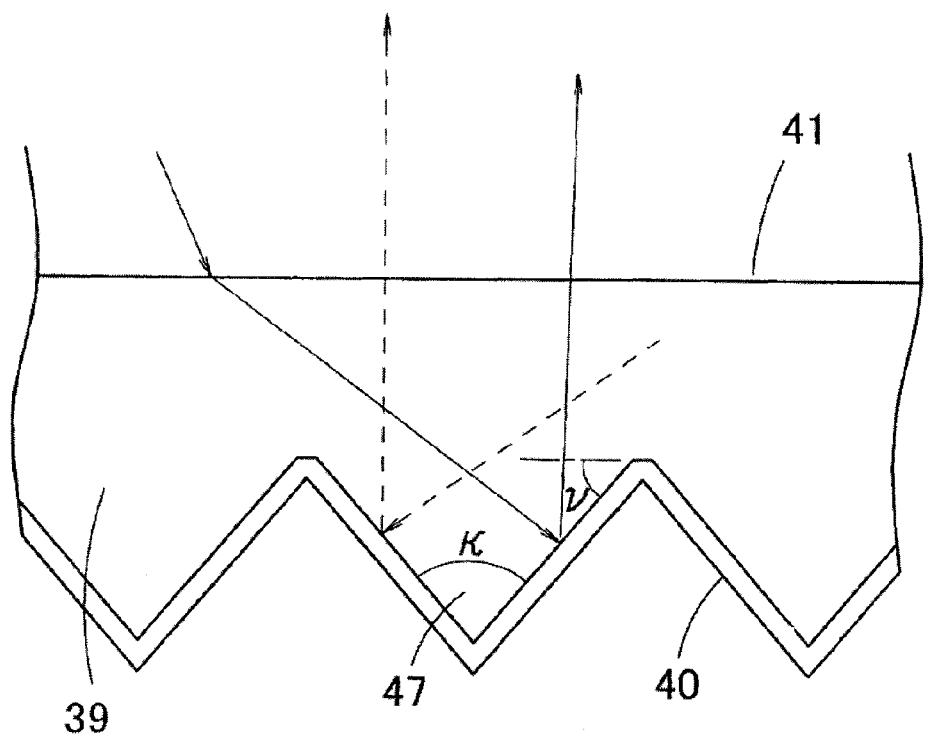
FIG. 13 is a view showing the behavior of the light in the deflection pattern.

(Regarding deflection pattern) FIG. 13 is a view showing the behavior of the light at the deflection pattern 47 in accordance with one or more embodiments of the invention. The deflection pattern 47 and the reflection layer 40 act to reflect the light entered to the low refraction index layer 39 in the direction perpendicular to the light exit surface 44, the optical path of which is shown with an arrow in FIG. 13. The deflection pattern 47 is a bar-shaped pattern having a triangular cross section, and is projected to the lower surface of the low refraction index layer 39. The deflection pattern 47 has a cross-sectional shape of an isosceles triangle due to reasons such as easiness to form a basic die. If the cross-section of the deflection pattern 47 is an isosceles triangle, the inclined plane on the side opposite to the point light source 32 acts to reflect the light from the light source direction (light indicated with a solid line arrow in FIG. 13) and exit the light from the light exit surface 44. The broken line arrow of FIG. 13 represents the light that reached the end face of the light guide substrate 38 or the low refraction index layer 39, reflected at the relevant end face and then returned, where the inclined plane on the light source side acts to reflect the return light and exit the light from the light exit surface 44.

Figure 14:
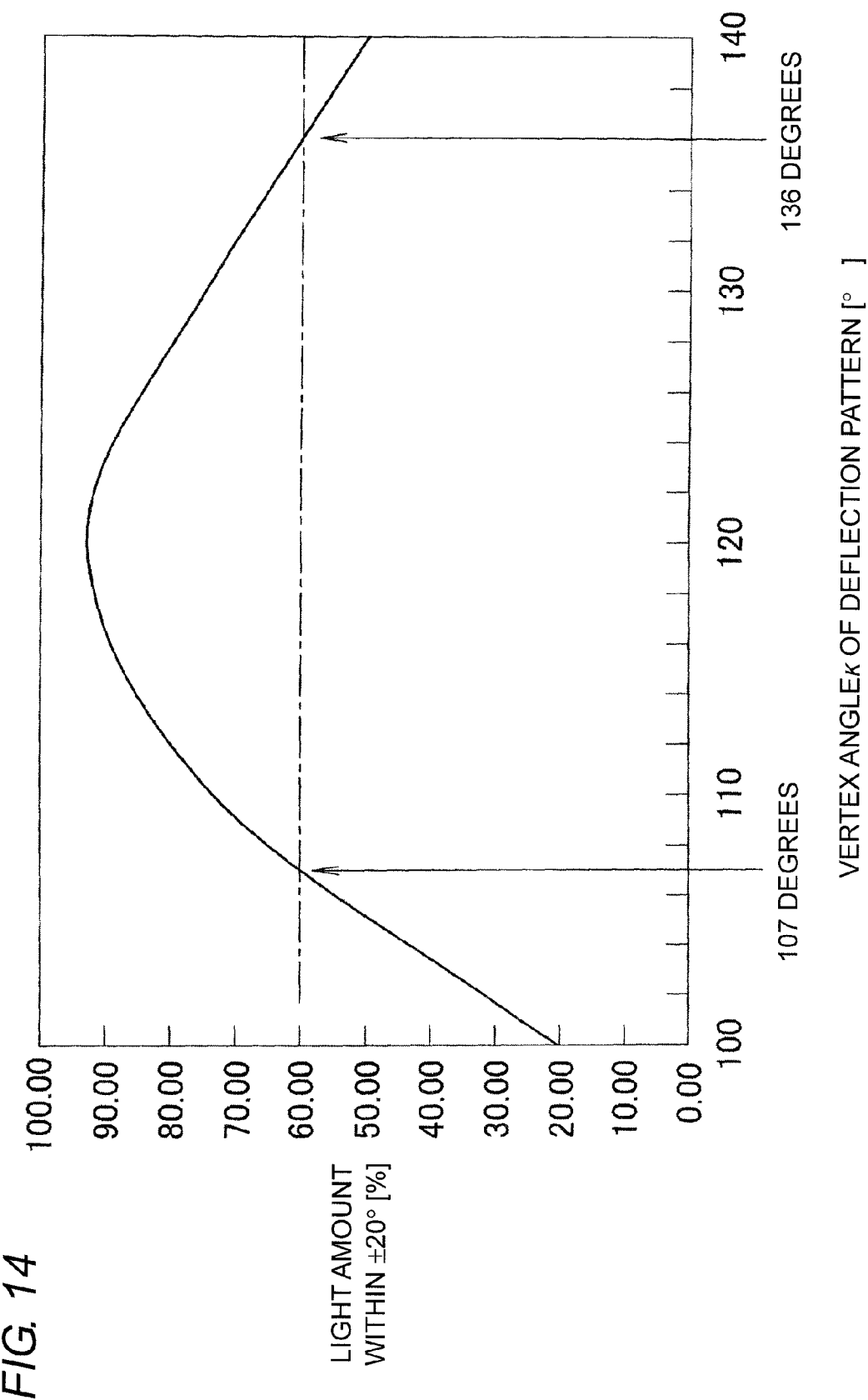
FIG. 14 is a view showing the ratio of the light amount contained in the range of ±20° at the directional characteristics with respect to the value of the vertex angle κ of the deflection pattern.

The vertex angle κ of the deflection pattern 47 is desirably greater than or equal to 107° and smaller than or equal to 136°. The reasons therefor are shown in FIG. 14. FIG. 14 shows the ratio of the light amount contained in the range of ±20° at the directional characteristics with respect to the value of the vertex angle κ of the deflection pattern 47 in accordance with one or more embodiments of the invention. The horizontal axis of FIG. 22 shows the vertex angle κ of the deflection pattern 47 in accordance with embodiments disclosed herein. The vertical axis of FIG. 14 shows, in percentage, the ratio of the total light amount of the light exit in the direction within ±20° with respect to the total light amount of the light exit in the direction within ±90° with respect to the normal line of the light exit surface 44 at the directional characteristics of the light exit from the light exit surface 44. Such ratio of light amount merely needs to be greater than or equal to 60%, and the value of the vertex angle κ in such a case is recognized to be greater than or equal to 107° and smaller than or equal to 136° from FIG. 14. Therefore, the vertex angle κ of the deflection pattern 47 is desirably greater than or equal to 107° and smaller than or equal to 136°. The peak direction at the directional characteristics of the light exit from the light exit surface 44 can be controlled by the inclination angle ν of the inclined surface of the deflection pattern 47.

Figure 15:
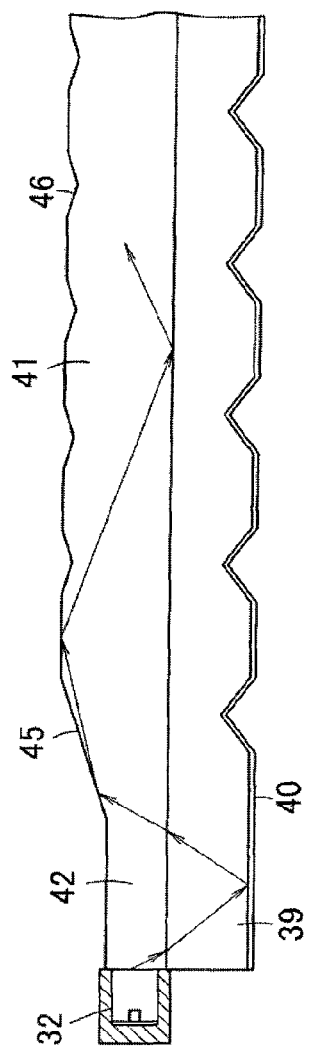
FIG. 15 is a schematic view showing an area light source device according to a variant of the first embodiment.

FIG. 15 is a schematic view showing an area light source device according to variants to one or more embodiments of the invention. In the variants, the ends of the low refraction index layer 39 and the reflection layer 40 are extended to the end face of the light introducing section 42 (light incident end face 43). In this case, one part of the light entered from the light incident end face 43 leaks towards the low refraction index layer 39 side before entering the tapered portion 45. However, if the length of the tapered portion 45 is set long, one part of the light that entered from the light incident end face 43 is reflected at the reflection layer 40 and is always entered to the tapered portion 45 even if leaked towards the low refraction index layer 39 before entering the tapered portion 45, and hence the light is guided without leaking.

In one or more embodiments of the invention, the light guide plate can be easily formed since the low refraction index layer 39 and the reflection layer 40 are formed over the entire back surface of the light guide substrate 38, but the length of the tapered portion 45 needs to be sufficiently long to eliminate the leakage of light thereby increasing a dead space, and hence the low refraction index layer 39 and the reflection layer 40 are desirably started from the end of the tapered portion 45 (end of light guide plate main body 41) so as not to take the leakage light towards the low refraction index layer into consideration.

Figure 16:
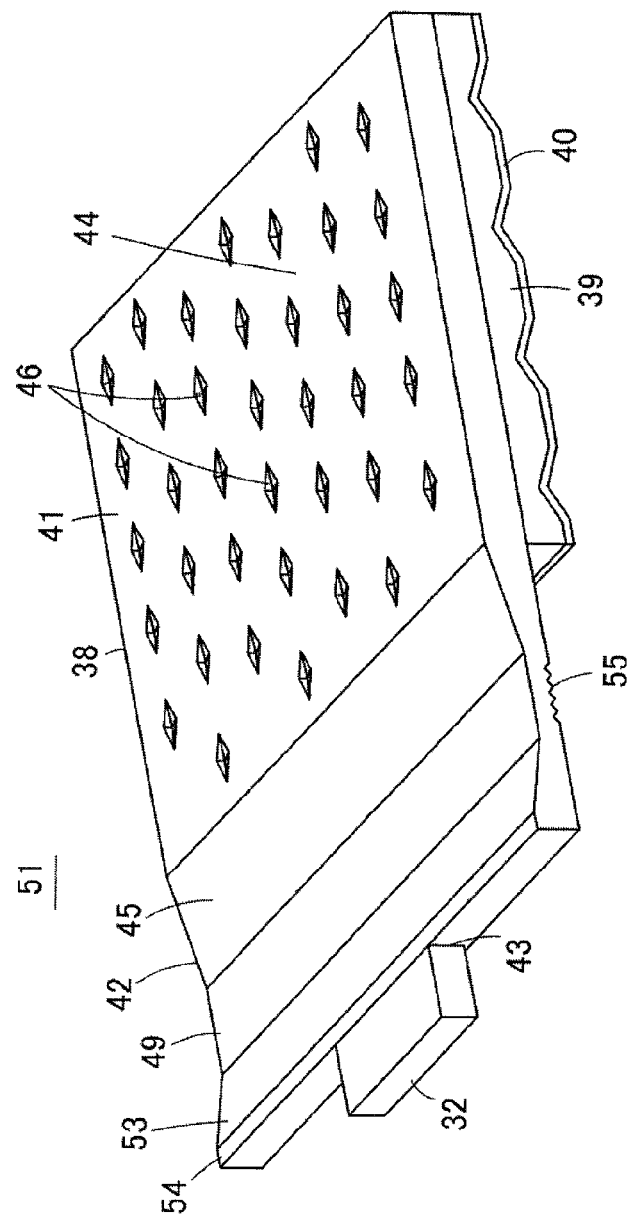
FIG. 16 is a perspective view showing an area light source device according to a second embodiment of the present invention.
Figure 17:
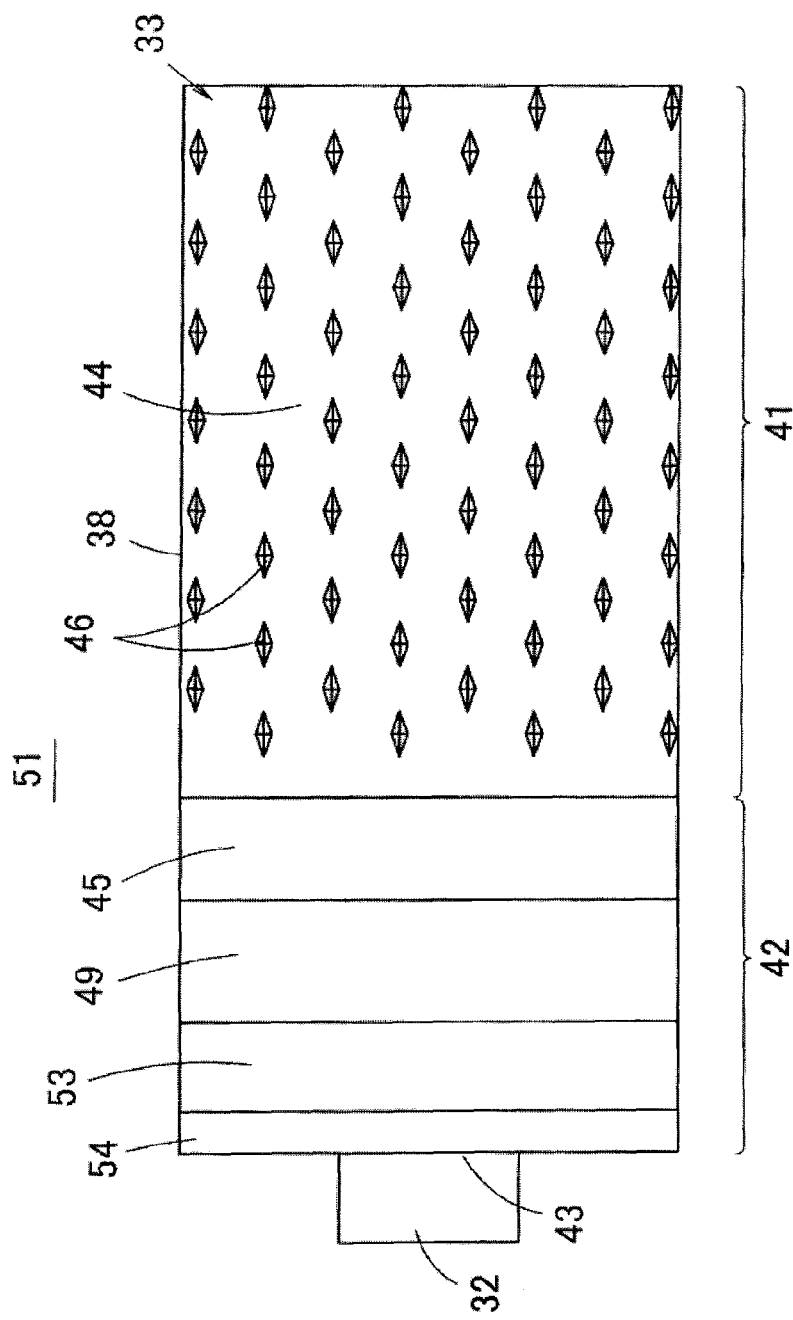
FIG. 17 is a plan view showing the area light source device of the second embodiment.
Figure 18:
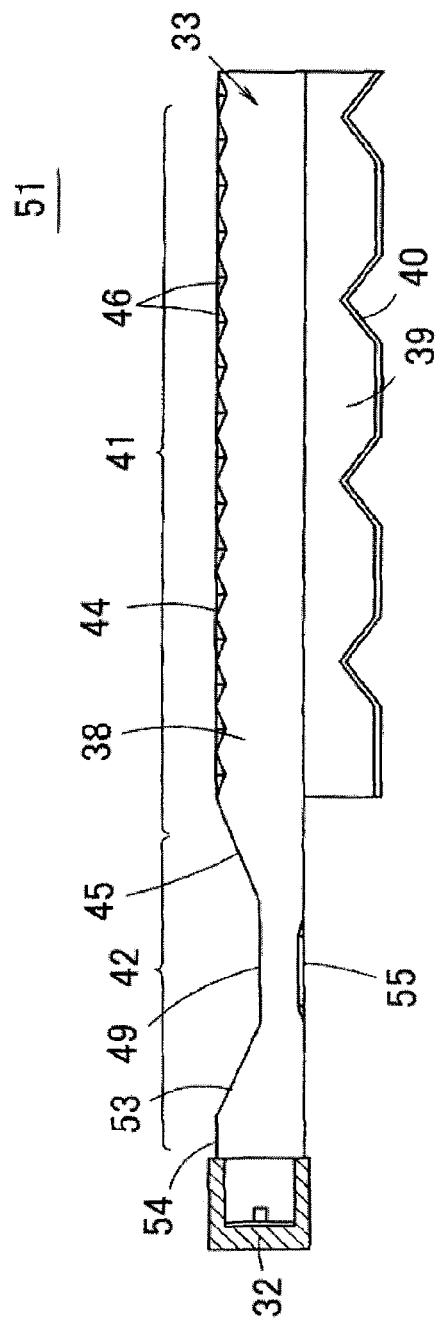
FIG. 18 is a schematic cross-sectional view of the area light source device of the second embodiment.

FIG. 16 is a perspective view showing an area light source device 51 according to a second embodiment of the present invention. FIG. 17 is a plan view of the area light source device 51. FIG. 18 is a schematic cross-sectional view of 51. In the area light source device 51, the thin plate portion 49 is arranged adjacent to the light source side of the tapered portion 45 and a reversed tapered portion 53 is arranged adjacent to the light source side of the thin plate portion 49, and a flat portion 54 is arranged adjacent to the light source side of the reverse tapered portion 53 in the light introducing section 42. The tapered portion 45 and the thin plate portion 49 are as described in the first embodiment. The reverse tapered portion 53 has a slope opposite to the tapered portion 45, and is formed such that the thickness of the light introducing section 42 becomes thinner the farther away from the point light source 32. The flat portion 54 has a thickness greater than the thin plate portion 49 and has substantially the same thickness as the light guide plate main body 41.

In the area light source device 51, the height of the light incident end face 43 is greater than in the first embodiment since the end of the light guide substrate 38 is the flat portion 54. Thus, the emitted light from the point light source 32 is less likely to leak to the outside of the light incident end face 43, and the usage efficiency (light collecting efficiency) of the light source enhances. However, the light reflected at the reverse tapered portion 53 easily leaks to the outside from the lower surface of the light introducing section 42 since the reverse tapered portion 53 exists adjacent to the flat portion 54.

Figure 19:
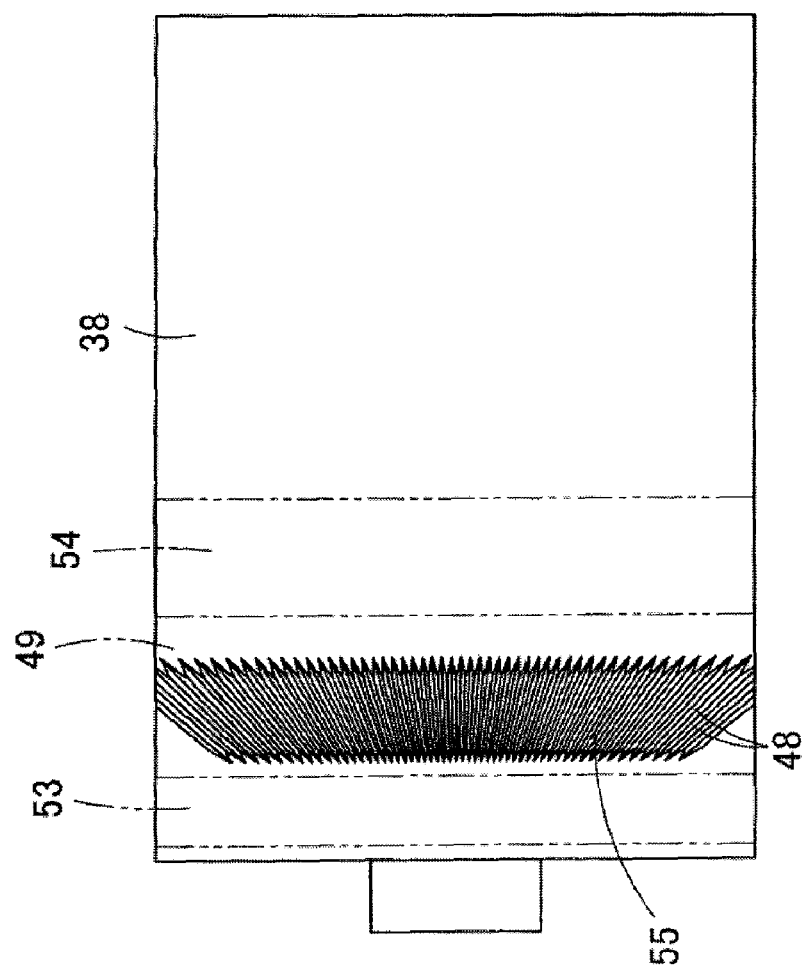
FIG. 19 is a plan view showing the directivity conversion unit arranged at the lower surface of the thin plate portion.
Figure 20:
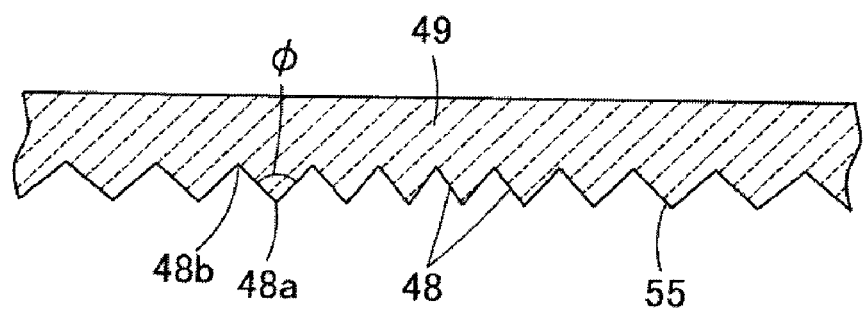
FIG. 20 is a cross-sectional view of the directivity conversion unit.

Thus, a directivity conversion unit 55 as shown in FIG. 19 is provided at the back surface of the light introducing section 42 in the thin plate portion 49. The directivity conversion unit 55 is arranged in a rectangular region or a band-shaped region and is configured by radially lining V groove shaped directivity conversion patterns 48 of the same shape as shown in FIG. 20.

Figure 21A:
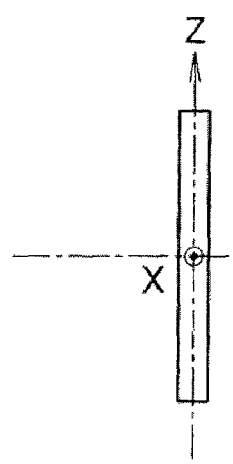
FIGS. 21A and 21B are views showing the directional characteristics of the light before entering the directivity conversion unit.
Figure 21B:
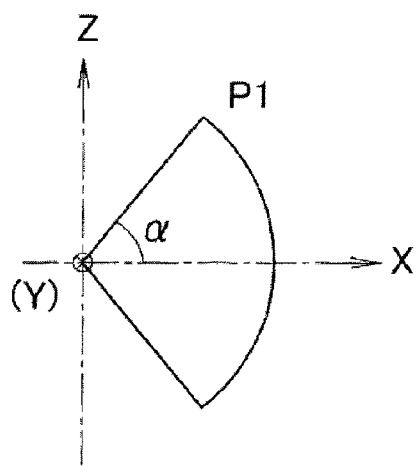
Figure 21C:
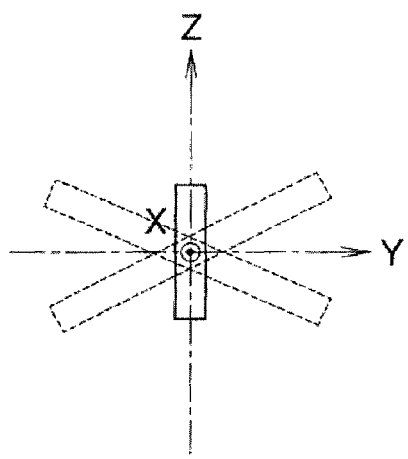
FIGS. 21C and 21D are views showing the directional characteristics of the light after passing the directivity conversion unit.
Figure 21D:
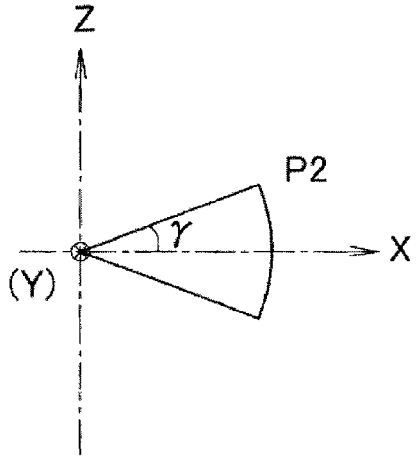
Figure 22A:
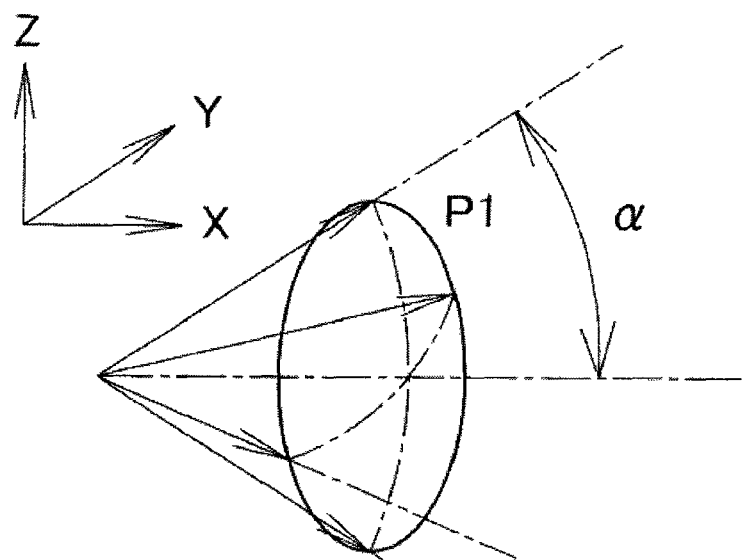
FIG. 22A is a schematic view showing the directional characteristics of the light immediately after entering the light introducing section.
Figure 22B:
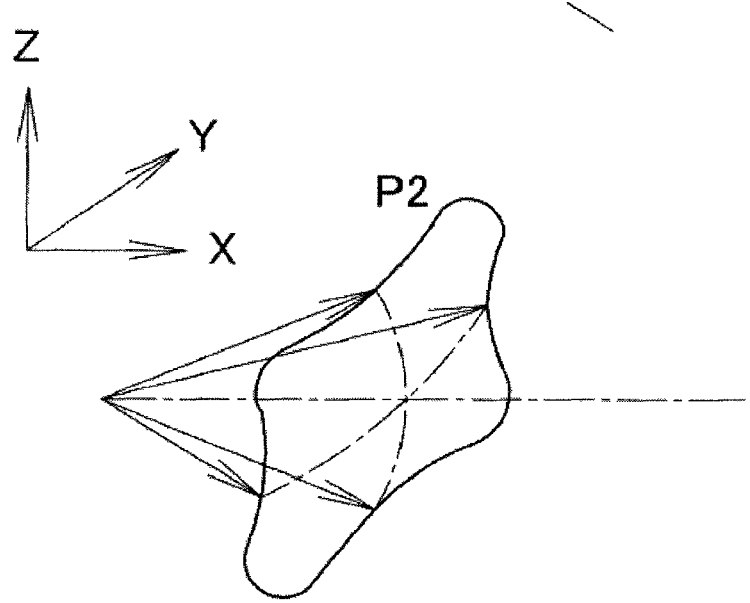
FIG. 22B is a schematic view showing the directional characteristics converted by the directivity conversion unit.

In summary, in accordance with one or more embodiments disclosed herein, the directivity conversion unit 55 acts to rotate or tilt the directional characteristics of the light about the X-axis at before and after reflecting the light. The light entered to the light introducing section 42 has, as a whole, circular cone shaped directional characteristic P1 as shown in FIG. 22A, which becomes a light having narrow directional characteristics in the Y-direction as shown in FIGS. 21A and 21B when seen from a certain point in the X-axis direction. When such light is reflected at the directivity conversion unit 55, the directional characteristics thereof rotate as shown in FIGS. 21C and 21D. As a result, the directivity spread in the ZX plane becomes small to γ. As a whole, the circular cone shaped directional characteristic P1 as shown in FIG. 18A are converted to flat directional characteristic P2 compressed in the Z-direction as shown in FIG. 22B.

Figure 23:
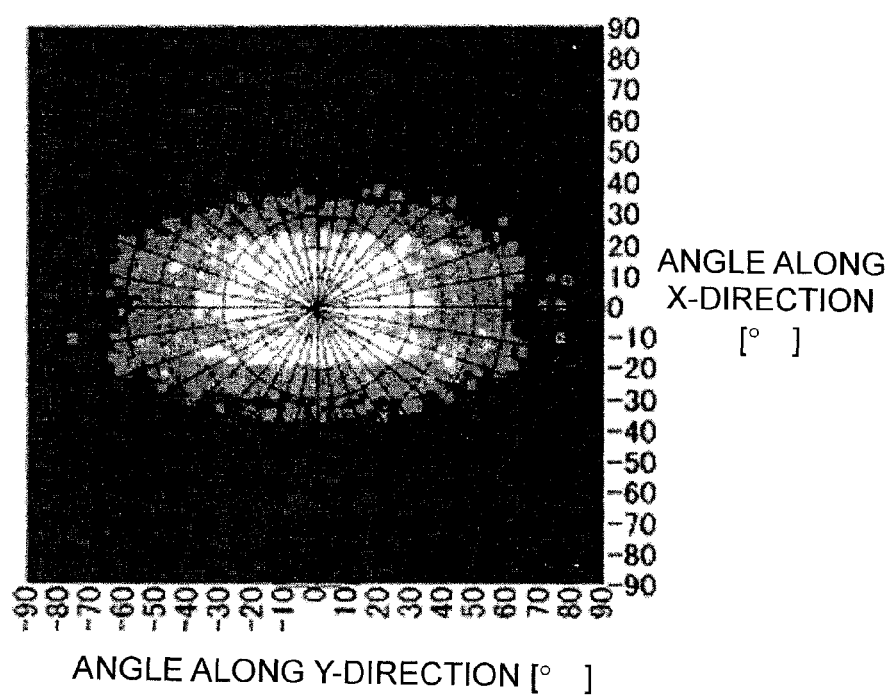
FIG. 23 is a view showing the directional characteristics (directional characteristics seen from the Z direction) of the light exit from the light exit surface.

FIG. 23 shows the directional characteristics (directional characteristics seen from the Z direction) of the light exit from the light exit surface 44 in the area light source device 51 of the second embodiment, where it is apparent that a very narrow directional characteristic can be realized in the X-direction. According to the directional characteristics of FIG. 23, the ratio of the total light amount of the light exit in the direction within ±20° with respect to the total light amount of the light exit in the direction within ±90° with respect to the normal line of the light exit surface 44 is 98%, which shows a very narrow directional characteristic.

Thus, if the directivity conversion unit 55 is arranged so that the light totally reflected at the reverse tapered portion 53 is received by the directivity conversion unit 55, the directional characteristics of the light totally reflected at the reverse tapered portion 53 and reached to the lower surface of the light introducing section 42 can be narrowed. The light reflected at the reverse tapered portion 53 so that the incident angle with respect to the bottom surface of the light introducing section 42 is reduced is less likely to leak from the bottom surface of the light introducing section 42 or the upper surface of the thin plate portion 49, and can be guided to the tapered portion 45. For the details of the directivity conversion unit 55, Japanese Patent Application NO. 2008-180147 or PCT/JP2009/003184 (reference document 1) and Japanese Patent Application NO. 2007-155797 or PCT/JP2008/61610 (reference document 2) are hereby incorporated by reference in their entirety.

In accordance with one or more embodiments of the invention, FIGS. 21B and 21D, the directional characteristics, which directional characteristics of light are seen from the ZX plane, have different directivity spread in the up and down direction depending on the viewing direction if the point light source 32 is seen from the diagonal direction in the XY plane. Thus, the shape of the pattern can be changed in the directivity conversion unit 55 for the front surface direction and the diagonal direction, but the directivity conversion pattern 48 in each direction is assumed as the same shape due to the easiness in manufacturing the pattern. Thus, the directivity conversion unit 55 may be provided to project out from the back surface of the light introducing section 42 or may be provided to be depressed.

The directivity conversion unit 55 or the directivity conversion pattern 48 may have shapes other than described herein. For instance, various shapes disclosed in the reference document 1 may be adopted. The most suitable design examples described in reference document 1 also can be referenced.

Figure 24:
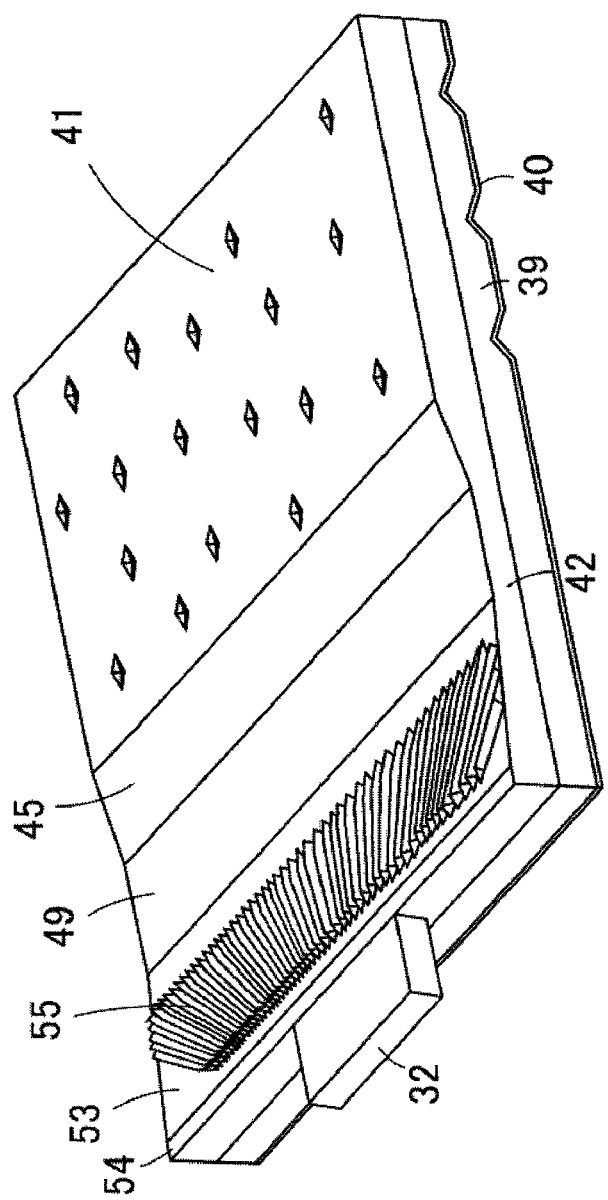
FIG. 24 is a perspective view showing a variant of the second embodiment.

(Variant of second embodiment) FIG. 24 is a perspective view showing a variant of the second embodiment. In the embodiment, the directivity conversion unit 55 is arranged on the surface of the reverse tapered portion 53. Furthermore, in the variant, the ends of the low refraction index layer 39 and the reflection layer 40 are extended to the light incident end face 43.

Figure 25A:
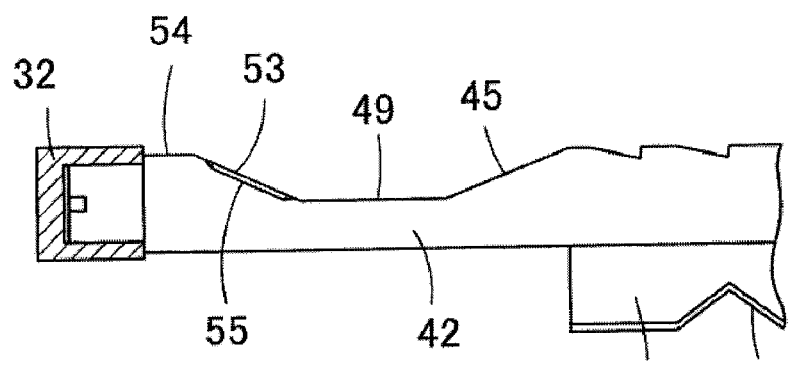
FIGS. 25A, 25B, and 25C are schematic views showing other variants of the second embodiment.

FIG. 25A shows another variant in accordance with one or more embodiments of the invention. In this variant as well, the directivity conversion unit 55 is arranged on the surface of the reverse tapered portion 53, but the low refraction index layer 39 and the reflection layer 40 are arranged only on the lower surface of the light guide plate main body 41.

Figure 25B:
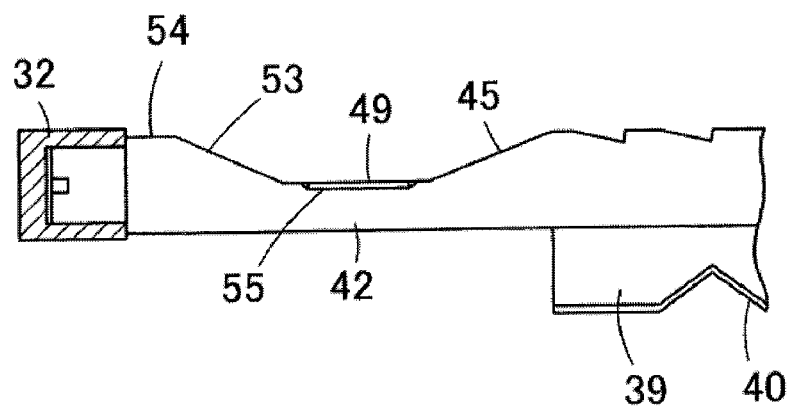
Figure 25C:
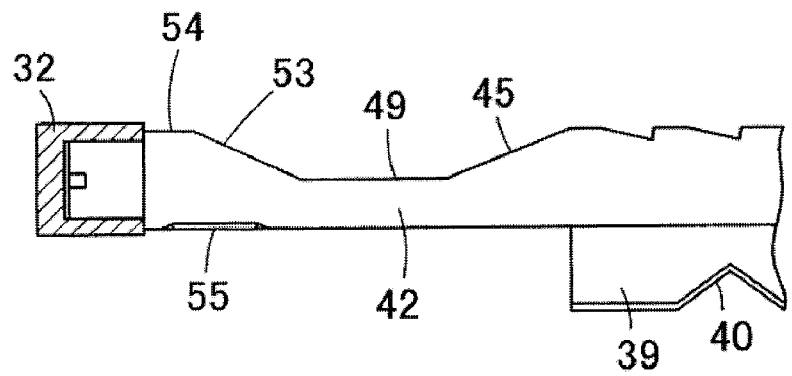

FIG. 25B shows another further variant in accordance with one or more embodiments of the claimed invention, where the directivity conversion unit 55 is arranged on the surface of the thin plate portion 49. In the variant of FIG. 25C, in accordance with embodiments disclosed herein, the directivity conversion unit 55 is arranged at the lower surface of the light introducing section 42 at the position shifted towards the flat portion 54 side than the reverse tapered portion 53.

Figure 26:
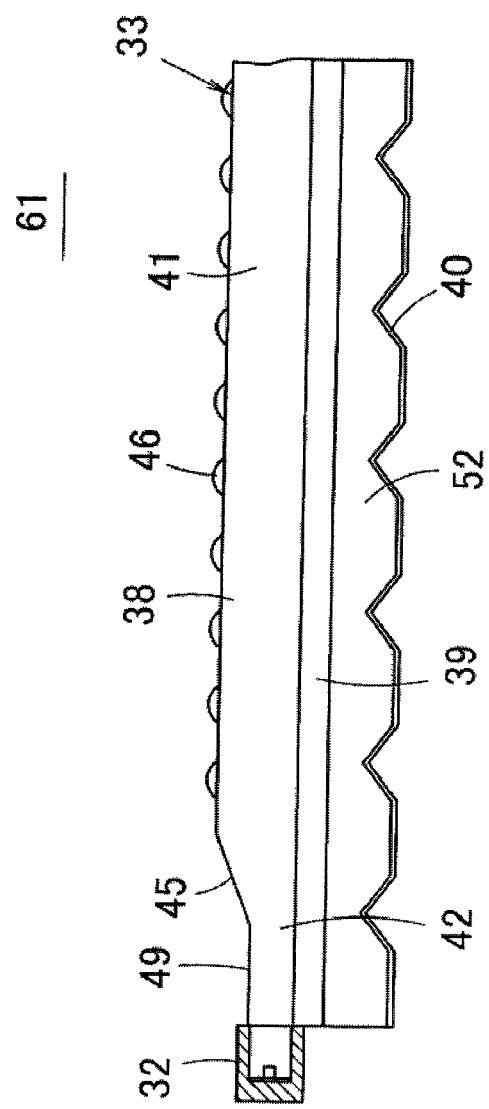
FIG. 26 is a perspective view showing an area light source device according to a third embodiment of the present invention.

FIG. 26 is a perspective view showing an area light source device 61 according to a third embodiment of the present invention. In the area light source device 61, a high refraction index layer 52 having an index of refraction of the same extent as the index of refraction of the light guide substrate 38 is arranged between the lower surface of the low refraction index layer 39 and the reflection layer 40 in the area light source device 31 of the first embodiment. The low refraction index layer 39 is formed by a transparent material (e.g., polymethyl methacrylate etc.) having an index of refraction of greater than or equal to 1.4 and smaller than 1.5, and has an even thickness to a thickness of about 5 μm. The high refraction index layer 52 is formed by a transparent material having an index of refraction of about 1.5 to 1.6 (e.g., polycarbonate resin having index of refraction of 1.59 etc.) and has a thickness of about 10 μm to 50 μm. The deflection pattern 47 is formed at the lower surface of the high refraction index layer 52, and the reflection layer 40 is arranged on the surface of the high refraction index layer 52.

Effects similar to the previous embodiments can be obtained in such area light source device 61 as well. In the area light source device 61 of the second embodiment, the light leaked into the low refraction index layer 39 is entered into the high refraction index layer 52 so that the light can be reflected by the reflection layer 40 with the directional characteristics further narrowed from the directional characteristics in the low refraction index layer 39. As a result, the directional characteristics of the light exit from the light exit surface 44 can be narrowed about 10° in the full width at half maximum compared to when the high refraction index layer 52 is not arranged. Moreover, the high refraction index layer 52 of a molded article formed with the deflection pattern 47 and the reflection layer 40 at the lower surface can be adhered to the lower surface of the light guide substrate 38 using a transparent resin adhesive having a lower index of refraction than the light guide substrate 38, and the low refraction index layer 39 can be formed by the cured transparent adhesive having a low index of refraction, and hence the manufacturing of the area light source device 61 is facilitated.

Figure 27:
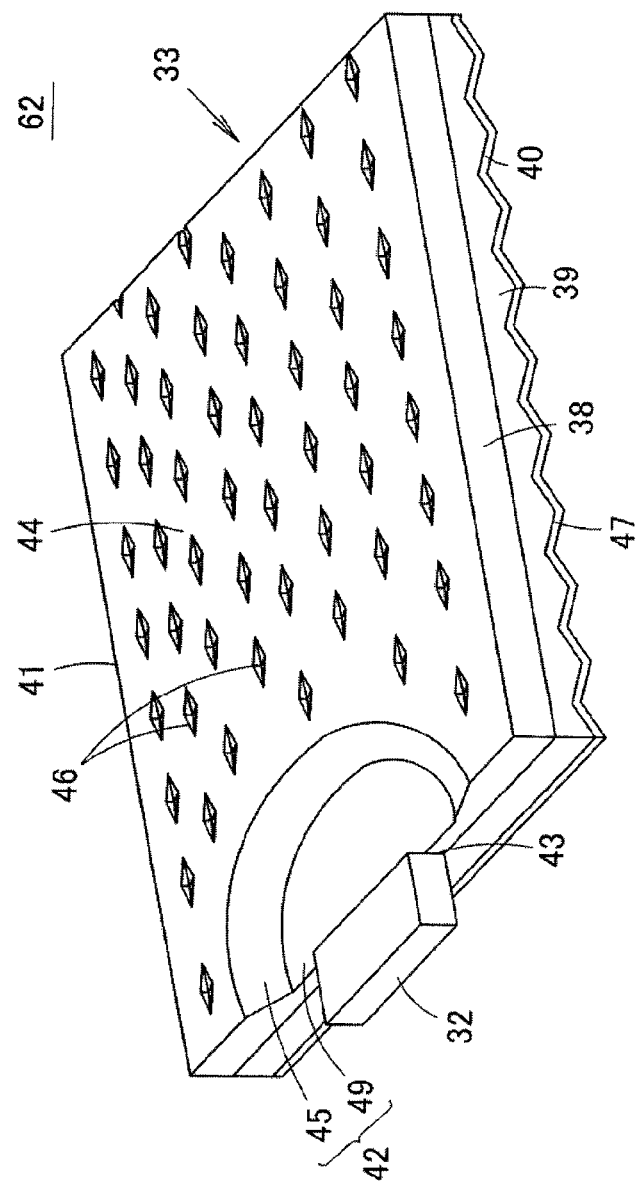
FIG. 27 is a perspective view showing an area light source device according to a fourth embodiment of the present invention.

FIG. 27 is a perspective view showing an area light source device 62 according to a fourth embodiment of the present invention. In the area light source device 62, the tapered portion 45 is formed to an arcuate shape with the point light source 32 as substantially the center, and the region of semicircular shape surrounded by the tapered portion 45 is assumed as the thin plate portion 49. Effects similar to previous embodiments can be obtained in such mode as well.

Figure 28:
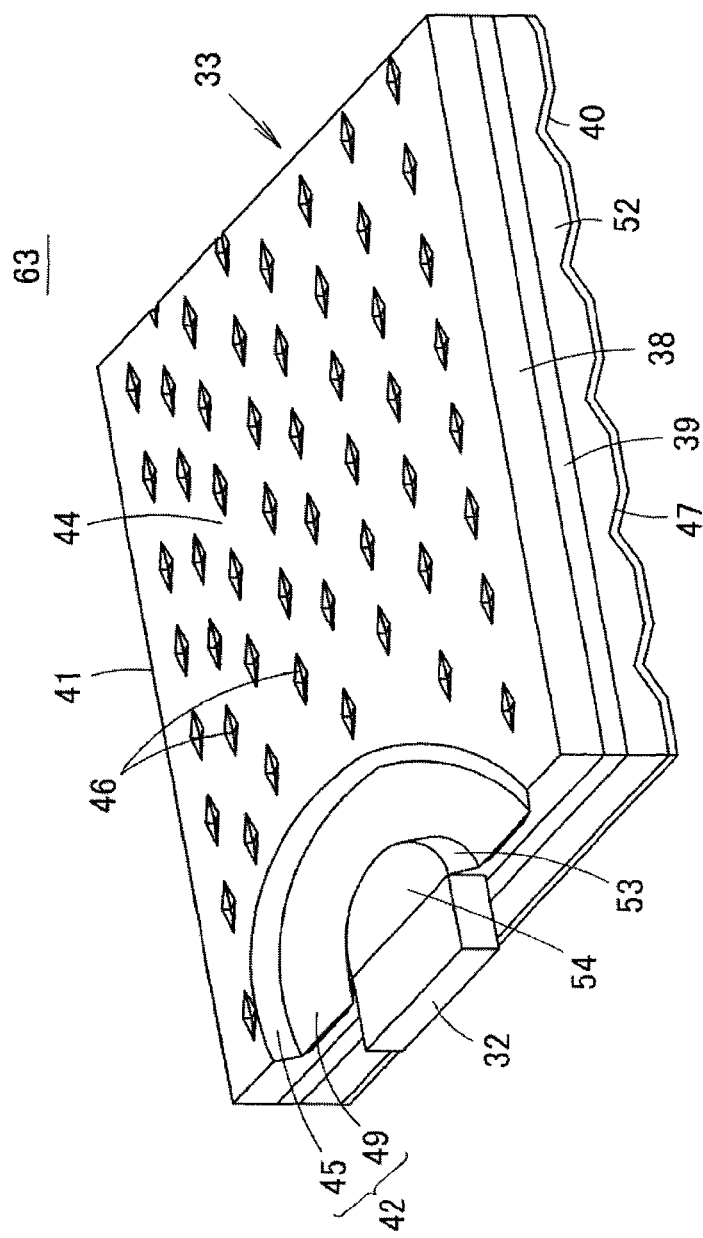
FIG. 28 is a schematic cross-sectional view showing an area light source device according to a fifth embodiment of the present invention.
Figure 29:
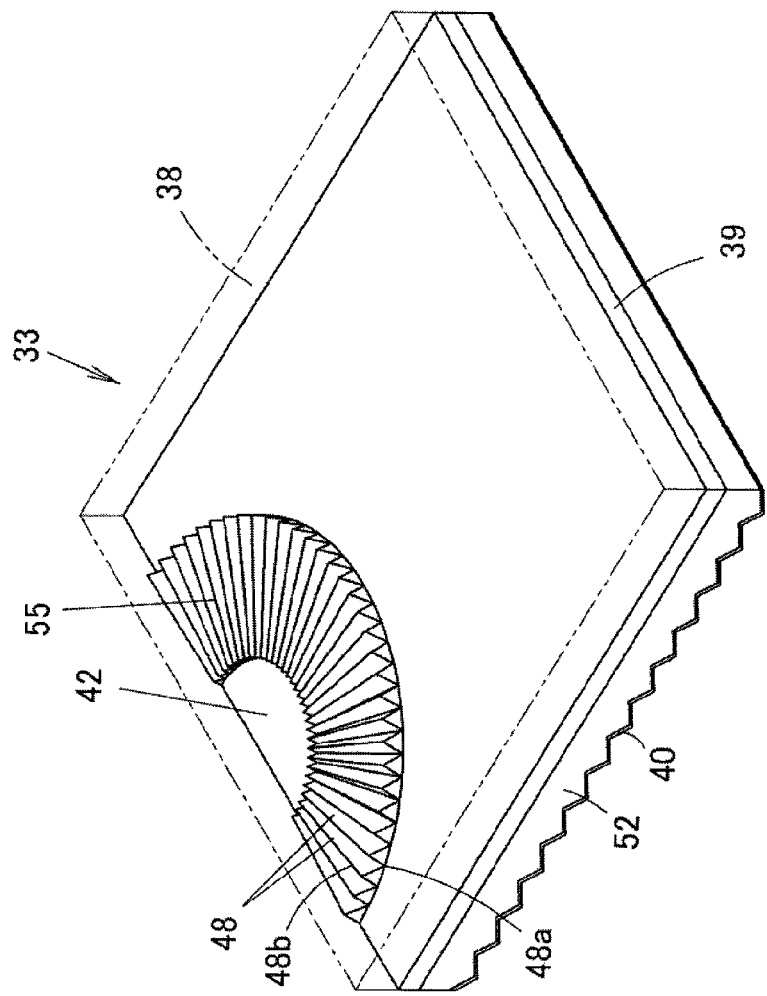
FIG. 29 is a perspective view showing the directivity conversion unit arranged at the back surface of the light guide substrate.

FIG. 28 is a perspective view showing an area light source device 63 according to a fifth embodiment of the present invention. In the area light source device 62, the tapered portion 45 is formed to an arcuate shape with the point light source 32 as substantially the center, a flat thin plate portion 49 is arranged to an arcuate shape along the inner periphery of the tapered portion 45, the reverse tapered portion 53 is formed along the inner periphery of the thin plate portion 49, and the region of semicircular shape surrounded by the reverse tapered portion 53 is assumed as the flat portion 54. The directivity conversion unit 55 of arcuate shape shown in FIG. 29 is arranged along the thin plate portion 49 at the lower surface of the thin plate portion 49. The directivity conversion unit 55 is arranged in an arcuate region having the vicinity of the position, where the point light source 32 is arranged, as a center. The directivity conversion patterns 48 have a V groove-shape, and are radially arrayed with the center of the arcuate region of the directivity conversion unit 55 also as the center. Therefore, according to the present embodiment, each directivity conversion pattern 48 has the same shape, and the design of the directivity conversion pattern 48 or the directivity conversion unit 55 is facilitated. In FIG. 29, the directivity conversion unit 55 is formed by depressing the back surface of the light guide substrate 38, but may be provided so as to project out towards the low refraction index layer 39.

In this embodiment as well, the angle (vertex angle of hill portion) $\phi$ (see FIG. 20) formed by the inclined surfaces sandwiching the ridge line 48a at the cross section perpendicular to the ridge line 48a of the directivity conversion pattern 48 is preferably $107°<\phi<154°$, and more preferably about 120°. The reasons therefor are as follows.

Figure 30:
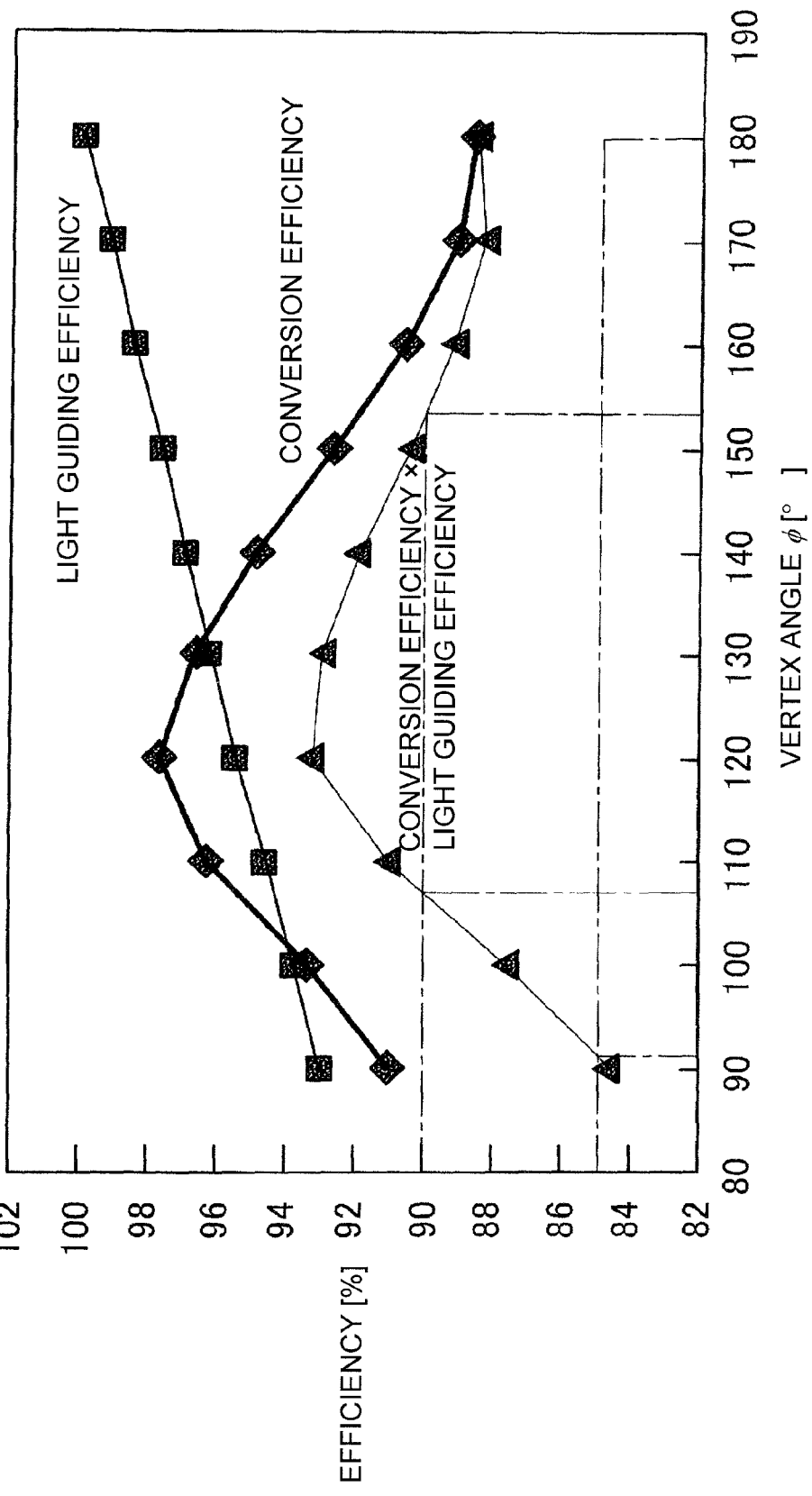
FIG. 30 is a view showing the relationship of the vertex angle ϕ of the hill portion formed in the directivity conversion pattern, and the directivity conversion efficiency, light guiding efficiency, and the directivity conversion efficiency×light guiding efficiency.

In accordance with one or more embodiments of the invention, FIG. 30 shows the relationship of the vertex angle $\phi$ of the hill portion formed in the directivity conversion pattern 48, and the directivity conversion efficiency, light guiding efficiency, and the directivity conversion efficiency×light guiding efficiency. This relationship is for a case where the radius of the inner peripheral edge of the directivity conversion unit 55 is r1=2.5 mm and the radius of the outer peripheral edge of the directivity conversion unit 55 is r2=3.8 mm, but similar tendency is also realized in other cases. The vertex angle $\phi$ of the hill portion is the vertex angle (maximum narrow angle formed by the inclined planes on both sides of the hill portion) at the cross section perpendicular to the ridge line 38a of the hill portion formed between the adjacent directivity conversion patterns 48. The directivity conversion efficiency represents how much light amount is in the range of directivity that becomes a target of the directivity of light transmitted to the light guide plate main body 41 (see reference document 1). In other words, directivity conversion efficiency=(light amount in range of target directivity)÷(entire light amount)=(entire light amount−light amount outside of range)÷(entire light amount). The light guiding efficiency represents the proportion of the light amount transmitted to the light guide plate main body 41 with respect to the light amount of the light immediately after entering the light introducing section 42. In other words, light guiding efficiency= (light amount transmitted to light guide plate main body)÷ (light amount immediately after entering)

According to FIG. 30, the conversion efficiency of directivity by the directivity conversion unit 55 becomes the highest when the vertex angle $\phi=120°$. As the vertex angle $\phi$ becomes smaller than 120°, the directivity conversion efficiency lowers, and at the same time, light leakage occurs in the directivity conversion unit 55 and the light guiding efficiency also lowers as the light amount of the light transmitted to the light guide plate main body 29 reduces. As the vertex angle $\phi$ becomes greater than 120°, the directivity conversion efficiency lowers, but light leakage reduces and thus the light guiding efficiency is enhanced.

Therefore, the most suitable vertex angle $\phi$ needs to be determined in view of both the directivity conversion efficiency and the light guiding efficiency, and hence it is desirably evaluated by directivity conversion efficiency×light guiding efficiency. The value of directivity conversion efficiency×light guiding efficiency is desirably directivity conversion efficiency×light guiding efficiency >0.85. To this end, vertex angle $\phi>92°$ is preferred according to FIG. 30. Furthermore, directivity conversion efficiency×light guiding efficiency >0.9 is more desirable, and $107°<\phi<154°$ is preferred. The value of directivity conversion efficiency×light guiding efficiency becomes a maximum value when vertex angle $\phi=120°$.

Figure 31:
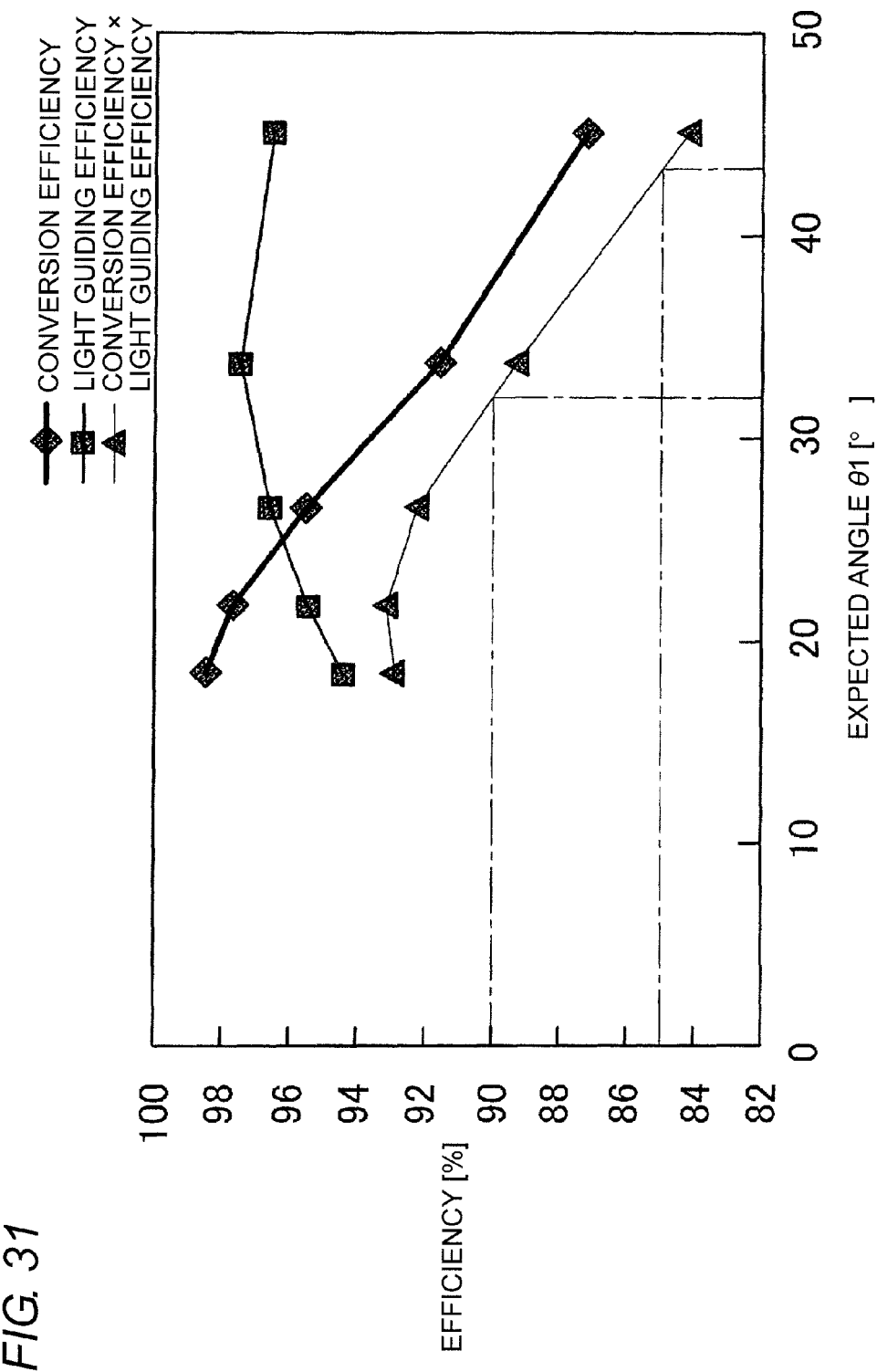
FIG. 31 is a view showing the relationship of an expected angle θ1 and the directivity conversion efficiency, the light guiding efficiency, and the directivity conversion efficiency× light guiding efficiency.
Figure 32:
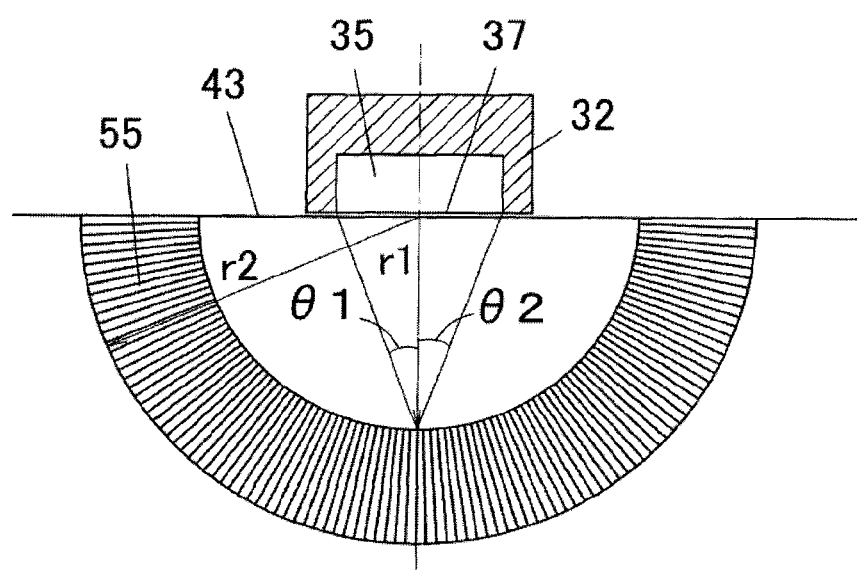
FIG. 32 is a view for describing the expected angles θ1, θ2.

In accordance with one or more embodiments of the invention, FIG. 31 is a view showing the relationship of an expected angle $\theta1$ and the directivity conversion efficiency, the light guiding efficiency, and the directivity conversion efficiency× light guiding efficiency. FIG. 31 is obtained through calculation assuming vertex angle $\phi=120°$. As shown in FIG. 32, the expected angle $\theta1$ is an angle formed by a line segment extended from the middle of the inner peripheral edge of the directivity conversion unit 55 to one end of the light exit window 37 of the point light source 32, and a line segment extended from the middle of the inner peripheral edge of the directivity conversion unit 55 to the middle of the light exit window 37. The relationship of FIG. 31 also applies to angle $\theta2$ formed by a line segment extended from the middle of the inner peripheral edge of the directivity conversion unit 55 to the other end of the light exit window 37 of the point light source 32, and a line segment extended from the middle of the inner peripheral edge of the directivity conversion unit 55 to the middle of the light exit window 37.

According to FIG. 31, $\theta1<43°$ for directivity conversion efficiency×light guiding efficiency >0.85. Furthermore, $\theta1 \leq 32°$ for directivity conversion efficiency×light guiding efficiency >0.9. Moreover, when $\theta1=22$, the value of directivity conversion efficiency×light guiding efficiency becomes a maximum value. Therefore, the expected angles $\theta1$, $\theta2$ are desirably $\theta1 \leq 32°$ and $\theta2 \leq 32°$, and in particular, $\theta1=\theta2=22°$ is especially desirable to have a satisfactory directivity conversion efficiency and light guiding efficiency.

In accordance with one or more embodiments of the invention, in FIG. 28, the diffusion patterns 46 are arranged parallel to each other, but the diffusion patterns 46 may be radially arranged in accordance with the directivity conversion unit 55. The deflection pattern 47 at the lower surface is not limited to being linearly extended, and may be extended to an arcuate shape.

Figure 33:
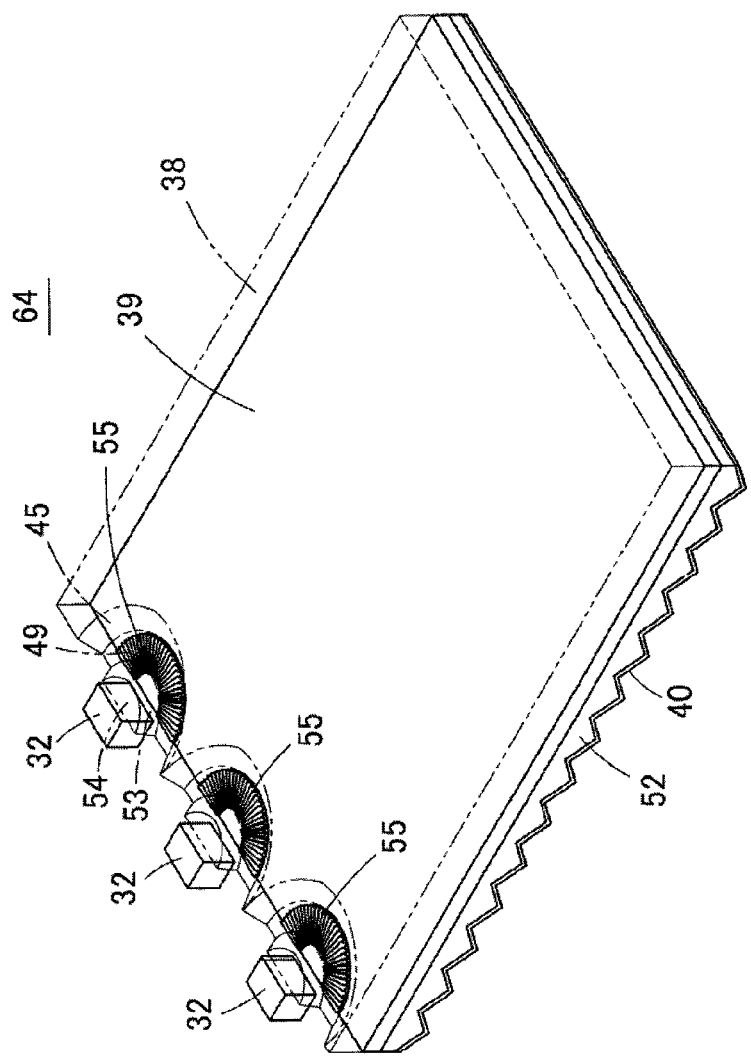
FIG. 33 is a perspective view showing an area light source device according to a variant of the fifth embodiment.

FIG. 33 is a perspective view showing an area light source device 64 in accordance with one or more embodiments of the invention. In the area light source device 64, the light introducing section 42 including the arcuate tapered portion 45, the thin plate portion 49, the arcuate reverse tapered portion 53, and the flat portion 54 is lined in plurals along the end edge of the light guide plate 33. The point light source 32 is arranged at each position facing the light incident end face of each light introducing section 42. The arcuate directivity conversion unit 55 is arranged at the lower surface of each thin plate portion 49. Since a plurality of point light sources 32 can be used in the area light source device 64, the light emission luminance of the area light source device 64 can be increased. In the case of an arrangement where the adjacent directivity conversion units 55 overlap each other, the overlapping portion of each directivity conversion unit 55 is desirably deleted so that the directivity conversion units 55 do not overlap.

When a plurality of point light sources 32 is used and a plurality of directivity conversion units 55 are lined along the end edge of the light guide plate 33, the distance (radius) r2 from the light incident end face to the outer peripheral edge of the directivity conversion unit 55 is further limited in addition to the condition that $r2 \leq T/(2 \tan \theta)$ (T is the thickness of the light introducing section 42, θ is the slope of the ridge line 48a of the directivity conversion pattern). This will be described below.

Figure 34:
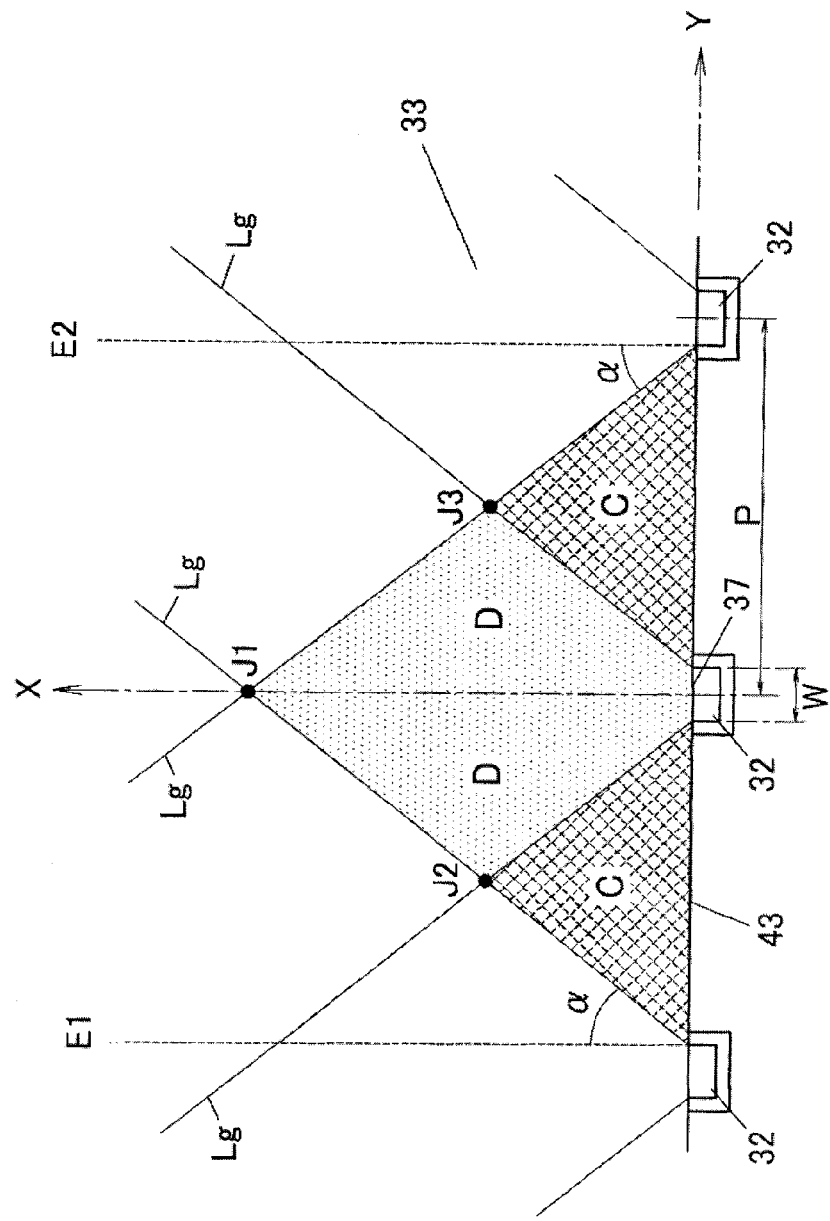
FIG. 34 is a schematic view showing the range the light exit from each point light source reaches in the light guide plate when configured by lining a plurality of point light sources.

FIG. 34 is a schematic view when the light introducing section 42 in which a plurality of point light sources 32 is lined along the end face is seen from the perpendicular direction in accordance with one or more embodiments of the invention. In FIG. 34, the X-axis is defined in the direction passing through the center of a certain point light source 32 and being perpendicular to the end face of the light guide plate 33, and the Y-axis is defined along the light incident end face 43 of the light guide plate 33, when seen from the direction perpendicular to the light guide plate 33. Assuming the index of refraction of the light guide substrate 38 is ng, the spread of the light exit from the light exit window 28 of the point light source 32 and entered to the light introducing section 42 from the light incident end face 43 is $\pm\alpha = \pm\arcsin(1/ng)$. In FIG. 34, the light beams passing the end of the directivity spread in the light introducing section 42 of the light exit from each point light source 32 are respectively expressed as Lg. Focusing on the region (region between line segments E1 and E2 in FIG. 34) between the two point light sources 32 sandwiching a certain point light source 32 (hereinafter referred to as middle point light source 32), the region C shown in FIG. 34 is the region where light from none of the point light sources 32 reach, the region D is the region where only the light from the middle point light source 32 reach, and the region other than the regions C and D is the region where the light of one of the point light sources 32 positioned on both side of the middle point light source 32 reach.

The directivity conversion unit 55 arranged on the front side of the middle point light source 32 reflects only the light of the middle point light source 32, where the directivity conversion unit 55 needs to be within a region, where the region C and the region D are merged, so as not to reflect the light of the point light sources 32 on both sides. Therefore, at the front side of the middle point light source 32, the directivity conversion unit 55 needs to be in a region that simultaneously satisfies the following three equations.

$$X > 0 \qquad \text{(Equation 5)}$$

$$X \leq \{-2Y + (2P-W)\}/(2 \tan \alpha) \qquad \text{(Equation 6)}$$

$$X \leq \{2Y + (2P-W)\}/(2 \tan \alpha) \qquad \text{(Equation 7)}$$

Here, P is the array pitch of the plurality of point light sources 32, W is the width of the light exit window 28 of the point light source 32, and $\alpha = \arcsin(1/ng)$, where ng is the index of refraction of the light guide substrate 38.

The X coordinate and the Y coordinate of the front end J1 of the region D and the front ends J2, J3 of the region C are respectively, J1 $((2P-W)/(2 \tan \alpha), 0)$ J2 $((P-W)/(2 \tan \alpha), -P/2)$ J3 $((P-W)/(2 \tan \alpha), P/2)$. For instance, when P=6.5 mm, ng=1.59, and W=2 mm, the coordinates become J1 (6.8, 0), J2 (2.78, −3.25), J3 (2.78, 3.25).

Figure 35A:
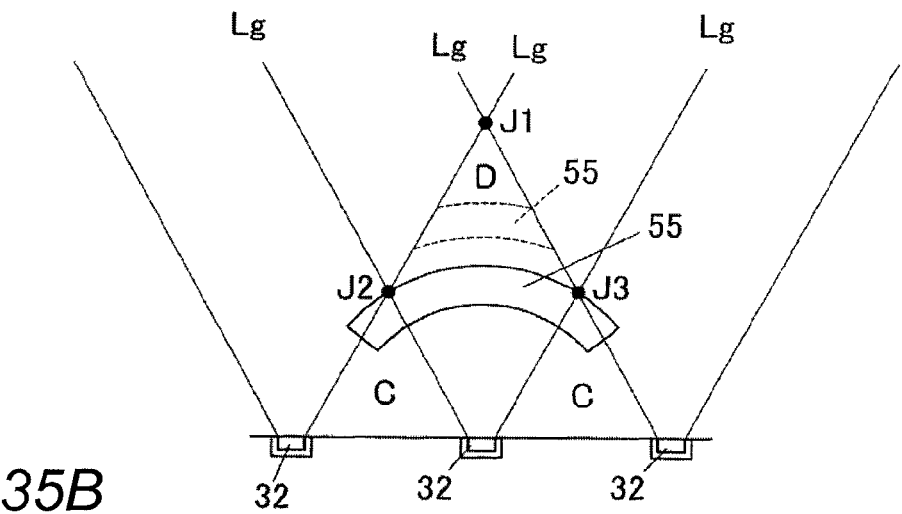
FIG. 35A is a view showing a heuristic arrangement of the directivity conversion unit.

However, if the directivity conversion unit 55 is arranged near the front end J1 of the region D such as with the directivity conversion unit 55 shown with a broken line in FIG. 35A even if within the regions C and D, one part of the light emitted from the middle point light source 32 reaches the light guide plate main body 41 without passing the directivity conversion unit 55. Furthermore, the height of the outer peripheral edge of the directivity conversion unit 55 may become too high or too deep. Thus, the largest directivity conversion unit 55 is desirably defined such that the outer peripheral edge passes the front ends J2, J3 of the region C as shown with a solid line in FIG. 35A. In addition, even if the outer peripheral edge of the directivity conversion unit 55 passes J2, J3, both ends of the directivity conversion unit 55 run out of the regions C and D such as with the directivity conversion unit 55 shown with a solid line in FIG. 35A if the length of the directivity conversion unit 55 in the circular arc direction becomes long when $\sin^2\alpha \leq (P-W)/(2P-W)$ [or $ng^2 \leq (2P-W)/(P-W)$].

Figure 35B:
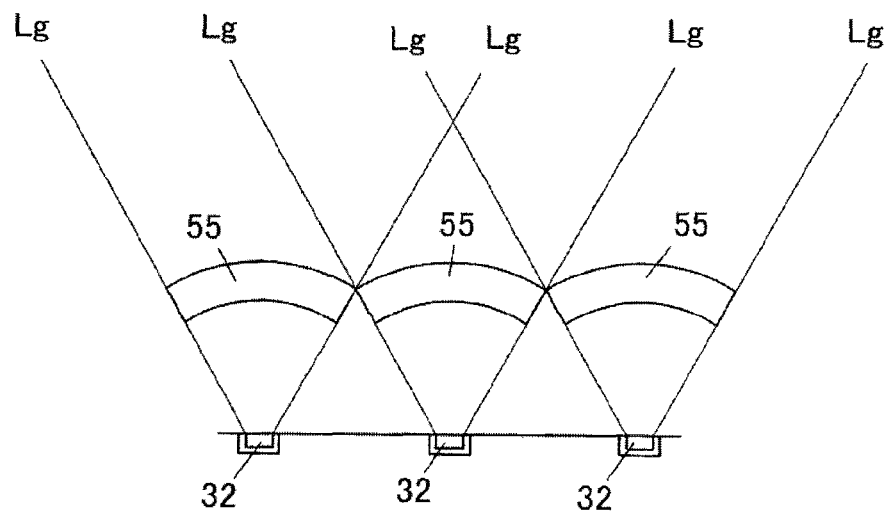
FIG. 35B is a view showing a preferred arrangement of the directivity conversion unit.

Therefore, when $\sin^2\alpha \leq (P-W)/(2P-W)$, the directivity conversion unit 55 is desirably arranged on the front side of each point light source 32 as shown in FIG. 35B so that the outer peripheral edge passes the front ends J2, J3 of the region C and so that the directivity conversion unit 55 does not run out from the regions C and D. In this case, the radius r2 from the middle of the light exit window 28 to the outer peripheral edge of the directivity conversion unit 55 can be expressed with the following equation 8.

$$r2 = \sqrt{\left(\frac{P-W}{2\tan\alpha}\right)^2 + \frac{P^2}{4}} \qquad \text{(Equation 8)}$$

The radius r2 of the outer peripheral edge of the directivity conversion unit 55 can be made smaller than the value of equation 8 as long as other conditions such as r2>r1 are satisfied, and hence, the radius r2 of the outer peripheral edge of the directivity conversion unit 55 sets the value shown with equation 8 as an upper limit value when $\sin^2\alpha \leq (P-W)/(2PW)$. Therefore, the radius r2 merely needs to satisfy the following equation 9.

$$r2 \leq \sqrt{\left(\frac{P-W}{2\tan\alpha}\right)^2 + \frac{P^2}{4}} \qquad \text{(Equation 9)}$$

Figures 36A, 36B:
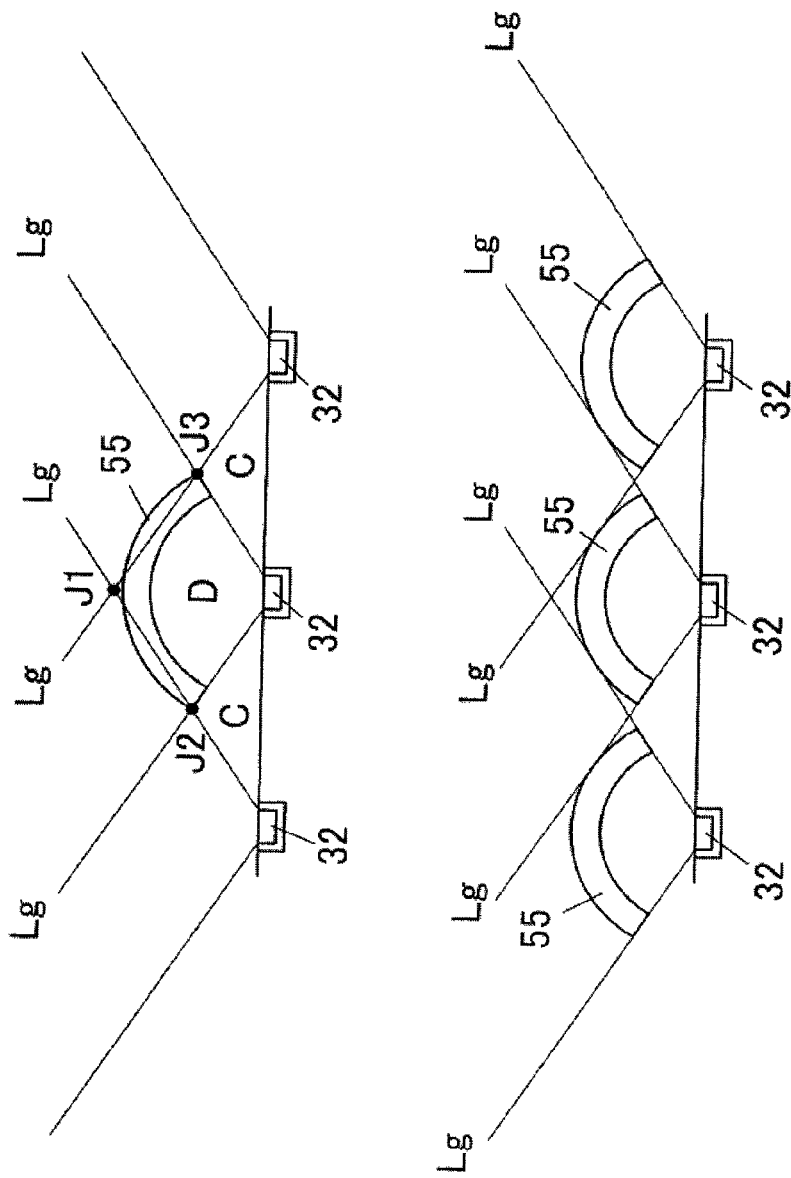
FIG. 36A is a view showing a heuristic arrangement of the directivity conversion unit.
FIG. 36B is a view showing a preferred arrangement of the directivity conversion unit.

When $\sin^2\alpha \geq (P-W)/(2P-W)$ [or $ng2 \leq (2P-W)/(P-W)$], if the directivity conversion unit 55 is arranged such that the outer peripheral edge passes the front ends J2, J3 of the region C, the directivity conversion unit 55 runs out of the regions C and D, as shown in FIG. 36A. Thus, in such a case, the outer peripheral edge of the directivity conversion unit 55 needs to be reduced until contacting the edge Lg of the directivity spread, as shown in FIG. 36B. The radius r2 of the outer peripheral edge in this case becomes, $$r2 = \{P-(W/2)\}\cos\alpha \qquad \text{(Equation 10)}.$$

Thus, when $\sin^2\alpha \geq (P-W)/(2P-W)$, the radius r2 of the outer peripheral edge of the directivity conversion unit 55 merely needs to satisfy the condition shown in equation 11.

$$r2 \leq \{P-(W/2)\}\cos\alpha \qquad \text{(Equation 11)}$$

Figure 37A:
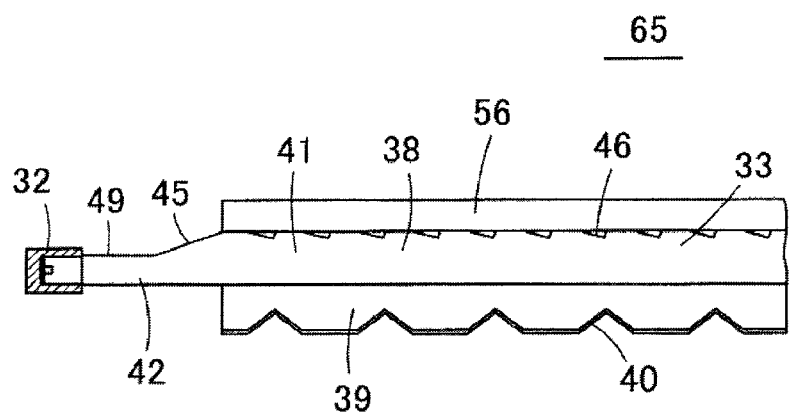
FIG. 37A is a schematic view showing an area light source device according to a sixth embodiment of the present invention.

FIG. 37A is a perspective view showing an area light source device 65 according to a sixth embodiment of the present invention. In the area light source device 65, a surface side low refraction layer 56 is arranged on the upper surface of the light guide substrate 38. The surface side low refraction layer 56 is formed from a transparent material (may be material having the same index of refraction as low refraction index layer 39) having a lower index of refraction than the light guide substrate 38 same as the low refraction index layer 39, and has a thickness of about 3 to 5 μm. The interior of the diffusion pattern 46 may be filled with the surface side low refraction layer 56, but an air layer is preferably left in the diffusion pattern 46 by using a sheet-like surface side low refraction layer 56. Furthermore, an optical sheet such as a diffusion plate or a prism sheet may be superimposed on the upper surface of the surface side low refraction layer 56.

Figure 37B:
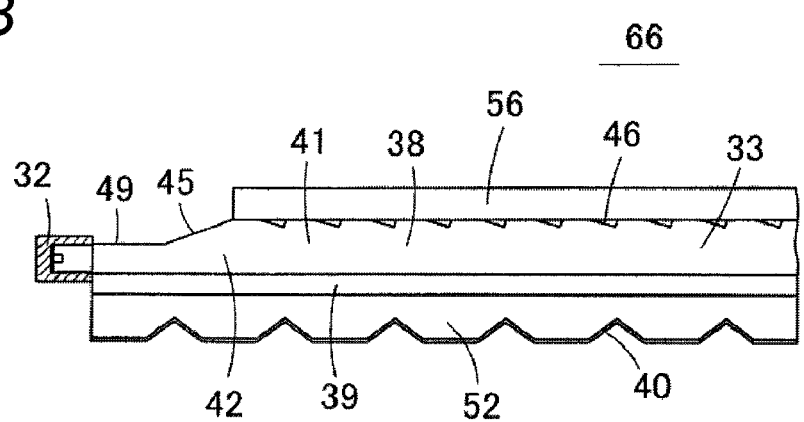
FIG. 37B is a schematic view showing a variant of the sixth embodiment.

FIG. 37B shows a variant of the sixth embodiment. In the area light source device 66, the surface side low refraction layer 56 is arranged at the upper surface of the light guide substrate 38, and the high refraction index layer 52 is arranged at the lower surface of the low refraction index layer 39. In the variant shown in FIG. 37B, the low refraction index layer 39, the high refraction index layer 52, and the reflection layer 40 are extended up to the end face (light incident surface) of the light introducing section 42, but may be retracted so as not to get caught at the light introducing section 42 such as the area light source device 65 of FIG. 37A. In the area light source device 65 of FIG. 37A, the low refraction index layer 39 and the reflection layer 40 may be extended to the end face of the light introducing section 42.

Figure 38A:
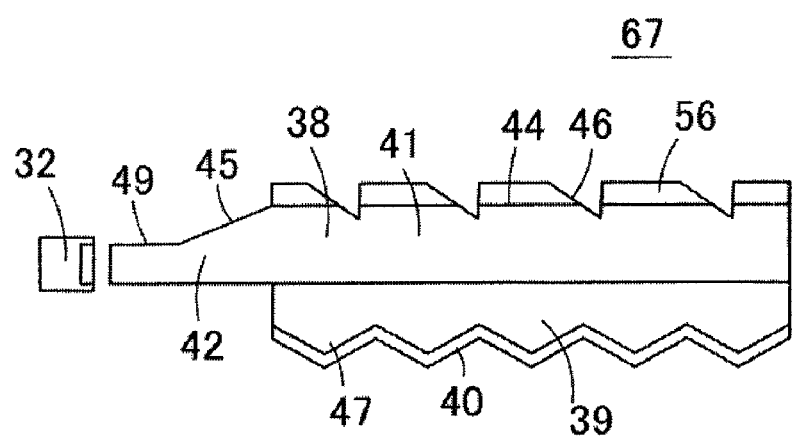
FIG. 38A is a schematic view showing another variant of the sixth embodiment.
Figure 38B:
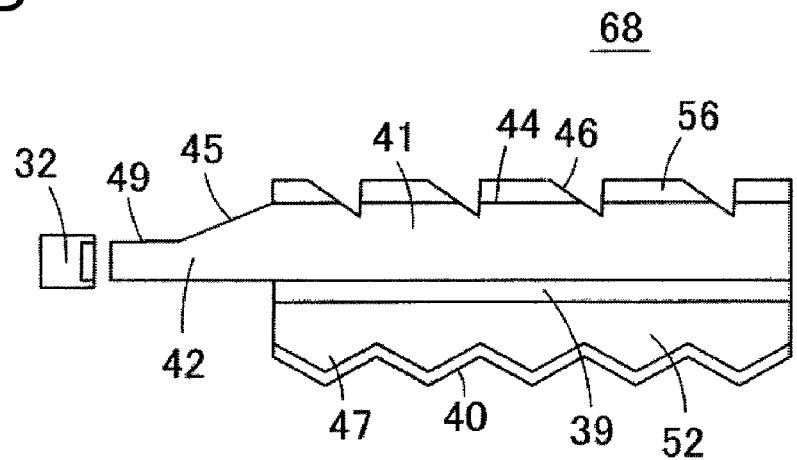
FIG. 38B is a schematic view showing another further variant of the sixth embodiment.

In accordance with one or more embodiments of the invention, as with the area light source devices 67, 68 shown in FIGS. 38A and 38B, the diffusion pattern 46 may be formed to the depth from the upper surface of the surface side low refraction layer 56 to the light guide substrate 38.

In FIGS. 38A and 38B, the ends of one of or all of the surface side low refraction layer 56, the low refraction index layer 39, the high refraction index layer 52, and the reflection layer 40 may reach the end face of the light introducing section 42.

Figure 39:
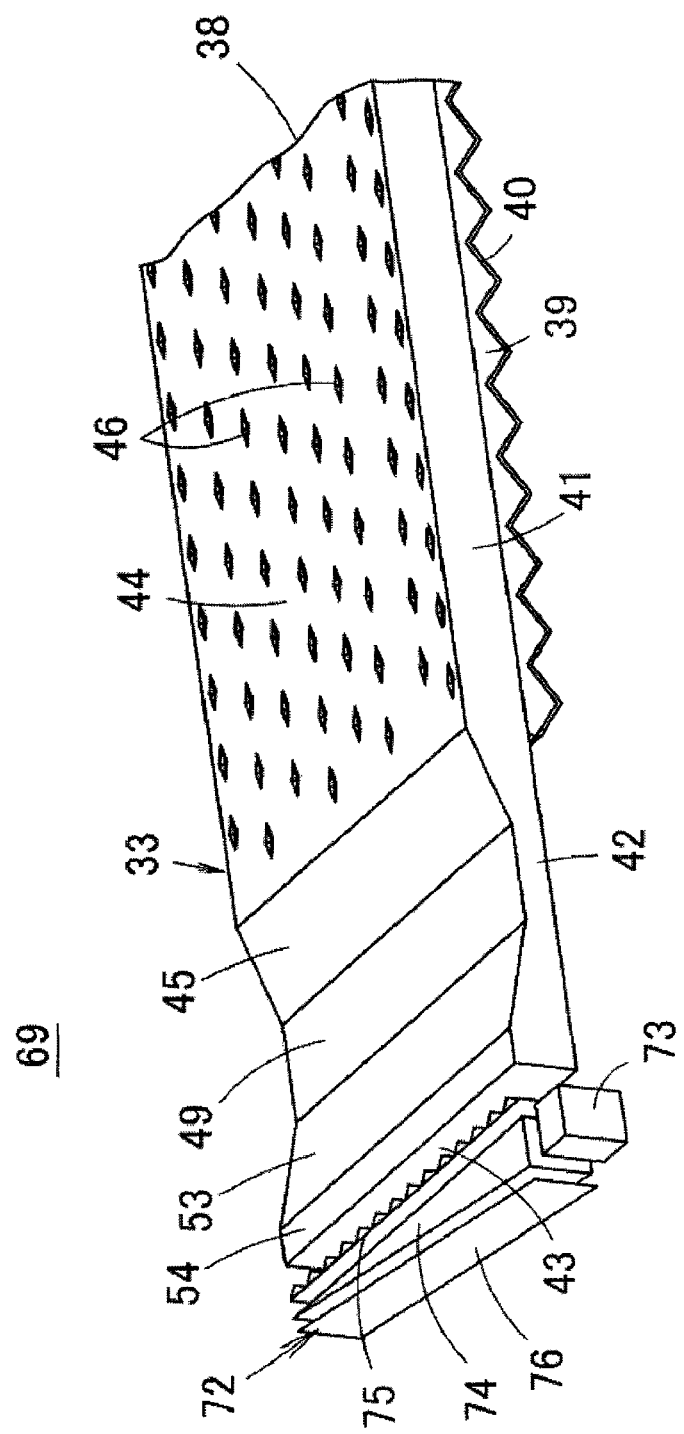
FIG. 39 is a perspective view showing an area light source device according to a seventh embodiment of the present invention.

FIG. 39 is a perspective view showing an area light source device 69 according to a seventh embodiment of the present invention. The area light source device 69 uses a bar-shaped light source 72 having substantially the same length as the width of the light guide substrate 38. The bar-shaped light source 72 is configured by a point light source 73 using an LED, a transparent wedge-shaped light guiding body 74, a prism sheet 75, and a reflection sheet 76. The point light source 73 faces the end face on the large thickness side of the wedge-shaped light guiding body 74. The light exit from the point light source 73 enters the wedge-shaped light guiding body 74 from the end face, and is guided to the distal end direction while repeating total reflection at the front surface and the rear surface of the wedge-shaped light guiding body 74. The light guided through the wedge-shaped light guiding body 74 is exit in the diagonal direction over the entire length from the front surface of the wedge-shaped light guiding body 74. The light exit in the diagonal direction has the optical path bent by passing the prism sheet 75 so as to exit in a direction substantially perpendicular to the light incident end face 43 of the light guide plate 33. The light leaked from the back surface of the wedge-shaped light guiding body 74 is reflected at the reflection sheet 76, returned to the wedge-shaped light guiding body 74, and reused.

Therefore, the light entering into the light introducing section 42 from the light incident end face 43 is a substantially parallel light, and thus the directivity conversion patterns 48 are also formed in parallel to each other facing the direction perpendicular to the light incident end face 43 in the area light source device 69.

Figure 40:
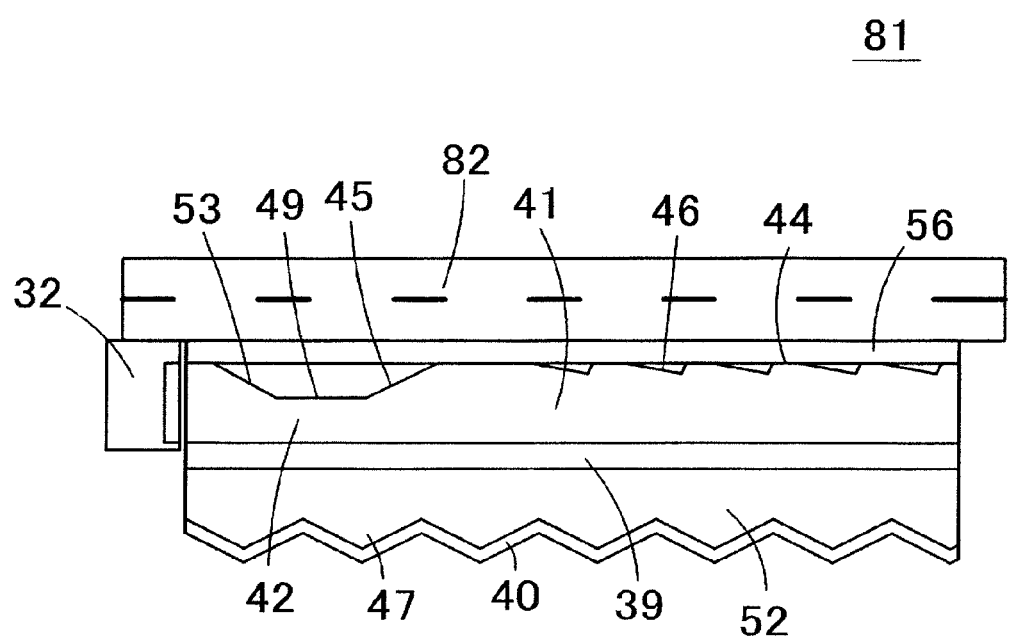
FIG. 40 is a schematic view showing a liquid crystal display device according to an eighth embodiment of the present invention.

FIG. 40 is a perspective view showing a liquid crystal display device 81 according to an eighth embodiment of the present invention. The liquid crystal display 81 has a liquid crystal panel 82 directly mounted on and integrated with the area light source device according to the present invention. The light guide substrate 38 can be adhered to and integrated with the lower surface of the liquid crystal panel 82 by using a transparent adhesive resin (connection layer) for the surface side low refraction layer 56, thereby preventing the occurrence of warp even in the case of a thin area light source device. Furthermore, since the upper surface of the point light source 32 is projected out from the upper surface of the light guide substrate 38 by the thickness of the surface side low refraction layer 56, the lower surface of the liquid crystal panel 82 adhered to the upper surface of the light guide substrate 38 with the surface low refraction layer 56 rides on the upper surface of the point light source 32, thereby stabilizing the liquid crystal panel 92.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An area light source device comprising:
   a light source;
   a light guide plate,
      wherein the light guide plate is arranged at a position facing the light source, for introducing light of the light source from a light incident end face and exiting the light to the outside from a light exit surface;
   wherein the light guide plate comprises:
      a light guide substrate made of translucent material,
      a low refraction index layer having a lower index of refraction than the light guide substrate,
         wherein the low refraction index layer being closely attached to a surface on a side opposite to the light exit surface of the light guide substrate , and
      a reflection layer closely attached to a surface on a side opposite to the light exit surface of the low refraction index layer;

wherein the light guide substrate comprises:
a light introducing section arranged at a position facing the light source, and
a light guide plate main body comprising the light exit surface for exiting the light introduced from the light introducing section to the outside integrally configured;
a tapered portion inclined to gradually increase the thickness of the light introducing section the farther away from the light source,
wherein the tapered portion inclined is arranged on the surface on the light exit side of the light introducing section or the surface on the opposite side;
a light control pattern for reflecting the light in the light guide plate main body and leaking the light towards the low refraction index layer from the surface on the side opposite to the light exit surface of the light guide plate main body,
wherein the light control pattern is formed on the light exit surface side of the light guide plate main body; and
a light exit unit for reflecting the light leaked to the low refraction index layer and exiting the light from the light exit surface,
wherein the light exit unit is formed on an boundary of the low refraction index layer and the reflection layer or a surface on the side opposite to the boundary of the reflection layer.

2. An area light source device comprising:
a light source;
a light guide plate,
wherein the light guide plate is arranged at a position facing the light source, for introducing light of the light source from a light incident end face and exiting the light to the outside from a light exit surface;
wherein the light guide plate comprises:
a light guide substrate made of translucent material,
a low refraction index layer having a lower index of refraction than the light guide substrate,
wherein the low refraction index layer being closely attached to a surface on a side opposite to the light exit surface of the light guide substrate,
a high refraction index layer having a higher index of refraction than the low refraction index layer,
wherein the high refraction index layer being closely attached to a surface on a side opposite to the light exit surface of the low refraction index layer, and
a reflection layer closely attached to a surface on a side opposite to the light exit surface of the high refraction index layer;
wherein the light guide substrate comprises:
a light introducing section arranged at a position facing the light source, and
a light guide plate main body comprising the light exit surface for exiting the light introduced from the light introducing section to the outside integrally configured;
a tapered portion inclined to gradually increase the thickness of the light introducing section the farther away from the light source,
wherein the tapered portion is arranged on the surface on the light exit side of the light introducing section or the surface on the opposite side;
a light control pattern for reflecting the light in the light guide plate main body and leaking the light towards the low refraction index layer from the surface on the side opposite to the light exit surface of the light guide plate main body,
wherein the light control pattern is formed on the light exit surface side of the light guide plate main body; and
a light exit unit for reflecting the light leaked to the high refraction index layer and exiting the light from the light exit surface,
wherein the light exit unit is formed on an boundary of the high refraction index layer and the reflection layer or a surface on the side opposite to the boundary of the reflection layer.

3. The area light source device according to claim 1, further comprising:
a second low refraction index layer having a lower index of refraction than the light guide substrate,
wherein the second low refraction index layer is closely attached to a surface on the light exit surface side of the light guide substrate without interposing an air layer.

4. The area light source device according to claim 1, wherein
a reverse tapered portion inclined to gradually reduce the thickness of the light introducing section the farther away from the light source,
wherein the reverse tapered portion is arranged in a region closer to the light source than the tapered portion at a surface on the light exit side of the light introducing section or a surface on the opposite side.

5. The area light source according to claim 4, further comprising:
a directivity conversion unit for enclosing the light entered into the light introducing section from the light incident end face in the light guide substrate,
wherein the directivity conversion unit is arranged on a surface on the light exit side of the light introducing section or a surface on the opposite side.

6. The area light source device according to claim 5, wherein the directivity conversion unit is configured by a plurality of directivity conversion patterns of V groove shape.

7. The area light source device according to claim 6, further comprising:
a vertex angle of a hill portion at a cross-section perpendicular to a ridge line of a hill portion,
wherein the vertex angle of a hill portion formed by the adjacent directivity conversion patterns is greater than or equal to 107° and smaller than or equal to 154°.

8. The area light source device according to claim 5, wherein
the light source is a point light source; and
the directivity conversion unit is configured by a plurality of directivity conversion patterns radially arrayed with the point light source or a certain position near the point light as a center.

9. The area light source device according to claim 5, wherein
the light source is a point light source;
when seen from a direction perpendicular to the light exit surface of the light guide plate, an angle formed by a direction extended from an arbitrary point on an edge on the side close to the point light source of the directivity conversion unit to one end of a light exit window of the point light source and a direction extended from the arbitrary point to a middle of the light exit window is smaller than or equal to 32°; and
an angle formed by a direction extended from an arbitrary point on an edge on the side close to the point light source of the directivity conversion unit to the other end of the light exit window of the point light source and a direction extended from the arbitrary point to the middle of the light exit window is smaller than or equal to 32°.

10. The area light source device according to claim 5, wherein the light source is a point light source;

the point light source is arranged in plurals along an end edge of the light guide plate; and the directivity conversion unit corresponding to the point light source is positioned inside a region simultaneously satisfying three equations of $X > 0$ $X \leq \{-2Y+(2P-W)\}/(2\tan\alpha)$ $X \leq \{2Y+(2P-W)\}/(2\tan\alpha)$ (where P: distance between the point light sources, W: width of light exit window of the point light source, and a: angle expressed as $\alpha = \arcsin(1/ng)$ when ng is index of refraction of the light guide plate), assuming an X-axis is defined in a direction passing a center of one of an arbitrary point light source and being perpendicular to the end edge of the light guide plate and a Y-axis is defined along the end edge of the light guide plate when seen from the direction perpendicular to the light exit surface of the light guide plate.

11. The area light source device according to claim 1, wherein an inclination angle ω of the tapered portion measured from a plane parallel to the light exit surface is the following, where ng is the index of refraction of the light guide substrate and n1 is the index of refraction of the low refraction index layer.

$$\arctan\left(\frac{n1 - \sqrt{ng^2 - 1}}{1 + \sqrt{ng^2 - n1^2}}\right) \leq \omega \leq \arctan\left(\frac{ng - n1}{\sqrt{ng^2 - n1^2}}\right)$$

12. The area light source device according to claim 1, wherein the surface on the light exit surface side of the reflection layer includes a plurality of inclined surfaces or the light exit unit.

13. The area light source device according to claim 12, wherein an angle formed by the adjacent inclined surfaces is greater than or equal to 107° and smaller than or equal to 136°.

14. The area light source device according to claim 1, wherein the light control pattern is configured by a projection pattern or a recess pattern formed at the light exit surface, an angle formed by a surface for reflecting the light at the projection pattern or the recess pattern and the light exit surface being smaller than or equal to 20°.

15. A liquid crystal display device comprising the area light source device according to claim 1, and further comprising:

a liquid crystal panel;

at least one connection layer, interposed at least between the light guide plate main body of the area light source device and the liquid crystal panel, for closely attaching the light guide plate main body to the liquid crystal panel; and wherein an index of refraction of one of the connection layers is lower than an index of refraction of the light guide plate main body.

\* \* \* \* \*

UNITED STATES PATENT AND TRADEMARK OFFICE
CERTIFICATE OF CORRECTION

PATENT NO. : 8,368,844 B2
APPLICATION NO. : 13/004648
DATED : February 5, 2013
INVENTOR(S) : Takako Ishikawa et al.

It is certified that error appears in the above-identified patent and that said Letters Patent is hereby corrected as shown below:

In the Claims:

At column 29, claim 10, line 21, the phrase "and a: angle expressed as $\alpha$ = arcsin" should read -- and $\alpha$: angle expressed as $\alpha$ = arcsin --.

At column 29, claim 11, line 30, the phrase "wherein an inclination angle ωof the tapered portion" should read -- wherein an inclination angle ω of the tapered portion --.

Signed and Sealed this
Ninth Day of April, 2013

Teresa Stanek Rea
*Acting Director of the United States Patent and Trademark Office*